US008904353B1

(12) United States Patent
Arguelles et al.

(10) Patent No.: US 8,904,353 B1
(45) Date of Patent: Dec. 2, 2014

(54) HIGHLY REUSABLE TEST FRAMEWORKS AND TESTS FOR WEB SERVICES

(75) Inventors: Carlos Arguelles, Shoreline, WA (US); Denis L. Ruckebusch, Duvall, WA (US)

(73) Assignee: Amazon Technologies, Inc., Reno, NV (US)

( * ) Notice: Subject to any disclaimer, the term of this patent is extended or adjusted under 35 U.S.C. 154(b) by 846 days.

(21) Appl. No.: 12/941,869

(22) Filed: Nov. 8, 2010

(51) Int. Cl.
*G06F 9/44* (2006.01)

(52) U.S. Cl.
USPC .......................................................... 717/124

(58) Field of Classification Search
CPC ...................................................... G06F 11/36
See application file for complete search history.

(56) References Cited

U.S. PATENT DOCUMENTS

| | | | |
|---|---|---|---|
| 6,353,897 B1 * | 3/2002 | Nock et al. | 714/38.12 |
| 7,536,679 B1 * | 5/2009 | O'Connell et al. | 717/126 |
| 7,895,565 B1 * | 2/2011 | Hudgons et al. | 717/106 |
| 2002/0059561 A1 | 5/2002 | Foster et al. | |
| 2005/0193291 A1 | 9/2005 | Subramanian et al. | |
| 2006/0206870 A1 | 9/2006 | Moulden et al. | |
| 2007/0028217 A1 | 2/2007 | Mishra et al. | |
| 2007/0043956 A1 | 2/2007 | El Far et al. | |
| 2008/0127101 A1 * | 5/2008 | Anafi et al. | 717/125 |

OTHER PUBLICATIONS

B.Stepien, I.Schieferdecker, "Automated Testing of XML/SOAP based Web Services", Proc. of the 13th. Fachkonferenz der Gesellschaft f 'ur Informatik (GI) Fachgruppe KiVS, Feb. 2003, 16 pages.
Merchant, C.; Tellez, M.; Venkatesan, J.; , "A Browser Agnostic Web Application UI Test Framework: Motivation, Architecture, and Design," Information Technology: New Generations, 2009. ITNG '09. Sixth International Conference on , vol., No., pp. 748-751, Apr. 27-29, 2009.

* cited by examiner

*Primary Examiner* — Li B Zhen
*Assistant Examiner* — Lenin Paulino
(74) *Attorney, Agent, or Firm* — Robert C. Kowert; Meyertons Hood, Kivlin, Kowert & Goetzel, P.C.

(57) ABSTRACT

Systems and methods for incrementally building tests and test frameworks may enable cost reduction and/or code sharing between teams testing various products (or features thereof) in different domains or of different product types. Test frameworks may be layered into standalone sub-framework packages that build on each other and whose object classes inherit object classes of lower layers. Sub-framework packages may provide generic utilities, domain-specific testing operations, application-specific testing operations, or operations for specific application types (e.g., web services). Test clients may plug into test frameworks at any layer to exercise features of a product under test. Tests may be built from components at multiple levels of abstraction, and may include test operations, test steps that include multiple test operations, and tests that include multiple test steps. Implementation details of products to be tested may only be visible to, and/or exercised by, the lowest-level elements of the tests (e.g., test operations).

37 Claims, 14 Drawing Sheets

| HttpTestFramework | 1210 |
|---|---|
| registerObserver(HttpThrottlingObserver)<br>registerObserver(HttpFrameworkObserverB)<br>unregisterObserver(HttpFrameworkObserverB)<br>⋮<br>notifyObservers() | | notifyObservers():
    for each observer registered in
    HttpTestFramework
        call observer notify()   *1220*

FIG. 12

HIGHLY REUSABLE TEST FRAMEWORKS AND TESTS FOR WEB SERVICES

BACKGROUND

A test framework is a system that provides utilities that enable users to build test cases on top of the test framework in order to test a target product. Typically, the test framework provides general-purpose functionality, such as logging, error checking, data generation, etc. Some test frameworks also include wrappers around a target product's features. Many custom test frameworks built by many independent engineers provide similar functionality.

Test frameworks are usually monolithic packages that provide wrappers around the functions of a specific product. In a large company, test development teams often do not share test frameworks and instead re-implement common functionality in many individual, and largely custom, test frameworks. On the other end of the spectrum, teams are sometimes forced to leverage a large, complex framework that does considerably more than they need it to do, simply because it offers them 80% of the functionality they do need. In such cases, teams may need to force fit the remaining 20% of the functionality that they need into a test framework that was not designed to provide that functionality.

Often test frameworks are built using assumptions about implementation details of the product to be tested that affect the code high up in the test architecture hierarchy. Such test frameworks typically must undergo heavy refactoring when the features, API or UI of the target product change. For example, in such test frameworks, tasks such as migrating the tests from using one network protocol or client package to another are very difficult to do.

BRIEF DESCRIPTION OF THE DRAWINGS

FIG. 12 illustrates an observer pattern for objects in a sub-framework package of a test framework hierarchy, according to one embodiment.

Figure 1:
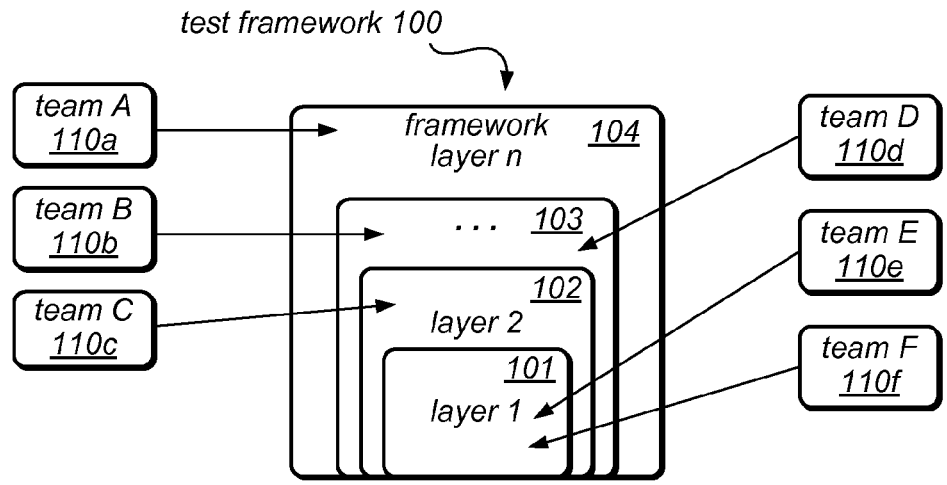
FIG. 1 is a block diagram illustrating a test framework built by layering standalone sub-framework packages in a test framework hierarchy, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The systems and methods described herein may be used to build highly reusable test frameworks and highly reusable test components for testing a variety of products, including web services. The techniques described herein may in some embodiments be used to incrementally build abstracted object-oriented test frameworks with an architecture that allows for increased code sharing among teams in a large organization with varying projects, provides increased framework flexibility, and reduces code duplication, when compared to traditional approaches for developing test frameworks and product tests. The architectures described herein may also be conducive to the abstraction of test operations and objects for implementing those test operations, allowing low level details of tests to be pushed down to the lowest possible layer of the test framework. In some embodiments, this may allow testers using the framework to respond to high churn in the implementation details of a product (e.g., a web services application) being tested without requiring a large number of changes in the higher layers of the framework hierarchy.

The techniques described herein may in some embodiments result in greatly reduced startup and maintenance costs, and successful code sharing between different teams, including teams that are testing products in different application domains and/or of different application types. For example, in some embodiments they may allow code sharing between teams developing tests and test frameworks for a variety of web services, such as relational databases services, data storage services, cloud computing services, third-party marketplace services, payment services for e-commerce, or website application hosting services. In various embodiments, the techniques described herein may be used to very quickly develop and launch a highly effective test framework for testing any given product or product type that is general enough to allow development teams to share both the framework concepts and resulting code.

In some embodiments, many of the issues described above in reference to traditional test frameworks may be resolved, or at least mitigated, by layering the test framework into more manageable standalone sub-framework packages that build on top of each other. For example, the first layer in the test framework may include a package of objects that provide fairly generic test routines and functions. An intermediate layer in the test framework may include a package of objects that provide test routines and/or functions that are applicable for testing features of products in a given application domain or in applications of a particular application type. The objects in this intermediate layer may inherit the test routines and/or functions of the generic objects of the first layer. Another layer in the test framework (e.g., one built on top of a domain-specific intermediate layer or an intermediate layer for a particular application type) may include objects that provide routines for testing specific features of a particular application. The objects in this layer may inherit the test routines and/or functions of the generic objects of the first layer and the test routines and/or functions of the objects in the intermediate layer.

In various embodiments, clients may be able to plug into the test framework at any given point of the test framework architecture (i.e. at any layer in the test framework hierarchy) without necessarily needing to access higher layers in the hierarchy. For example, if one or more features of a given product can be tested using the generic test routines of the first layer, a test team may plug into the test framework at that layer to access the objects that provide those routines. Since these test routines are generic, teams testing different types of products may plug into this layer in the test framework to access objects providing these test routines. If a feature of a given product can be tested using a test routine provided by an object in an intermediate layer of the test framework hierarchy, the test team may plug into the test framework at the intermediate layer to access that object. Other teams testing products in the same domain or of the same type may also be able to plug into the test framework at this layer to invoke one or more of the test routines provided by the objects in the intermediate layer. In order to test some of the specific features of a given product, the test team may need to plug into an application-specific layer in the test framework to invoke test routines provided by objects in a sub-framework package that are specific to the application. Other teams may plug into different sub-framework packages (packages of objects that provide test routines specific to different applications) at this layer in the test framework hierarchy.

In some embodiments, in addition to layering sub-framework packages of function and utilities in the test framework itself, further improvements in costs and code sharing may be realized by developing tests that are composed in multiple levels of abstraction. For example, in some embodiments, a test for a given product may include test steps that abstract away the implementation details of the given product (and/or the low-level test operations needed to exercise them). In such embodiments, only the low-level test operations may need to be modified if the product changes, while at the highest level of abstraction, the test may remain the same. Techniques for building tests using multiple levels of abstraction are described in more detail later.

One embodiment of a test framework built by layering standalone sub-framework packages on each other is illustrated in FIG. 1. In this example, test framework 100 includes layers 1-$n$ (represented in FIG. 1 by layers 101, 102, 103, and 104). As illustrated in FIG. 1, various teams developing tests for the same or different products can plug into test framework 100 at different levels in the test framework hierarchy in order to take advantage of the functions and/or utilities provided by objects in the corresponding sub-framework packages. A given team may not need access to all of the layers of the test framework, and may not be burdened by a requirement to maintain, understand, or include in their testing the extraneous routines provided by any sub-framework package(s) they do not use. For example, teams E and F (shown as 110e and 110f) may plug into layer 1 (shown as 101), team C (shown as 110c) may plug into layer 2 (shown as 102), teams B and D (shown as 110b and 110d) may plug into another intermediate layer in the hierarchy (shown as 103), and team A (shown as 110a) may plug into the nth (top) layer of test framework 100 (shown as 104). In some embodiments, teams may not need to understand, or even be aware of, any sub-framework packages other than the one(s) they plug into. Test framework architectures that include this layering of sub-framework packages are describe in more detail below, according to various embodiments.

As noted above, traditional test frameworks must typically undergo heavy code refactoring when the features, application programming interface (API), and/or user interface (UI) of the target application (e.g., a product being tested) changes. In some embodiments of the test systems described herein, in addition to the layering structure in the test framework described above, tests developed in the system may include a second dimension of layering hierarchy in the tests themselves. For example, in some embodiments, the low level details of each testing function are abstracted in an "operations" layer. Tests may include one or more intermediate layers that describe taking one or more "steps". In some embodiments, each such test step may be composed of one or many test operations, in a logical grouping; an upper, more English-like, layer may be used to describe a "test"; and each test may be composed of one or many test steps. In some embodiments, by abstracting the test design in this manner, most of the refactoring introduced by changes to the application code may be isolated to the lowest layer, a much smaller amount of refactoring may need to be applied at the next layer (at one or more intermediate layers), and few, if any, changes may be needed in the upper-most layer of the test. In addition, verification checks may be built at the level of the functionality that is being checked (rather than at a higher level of abstraction in the test).

Figure 2:
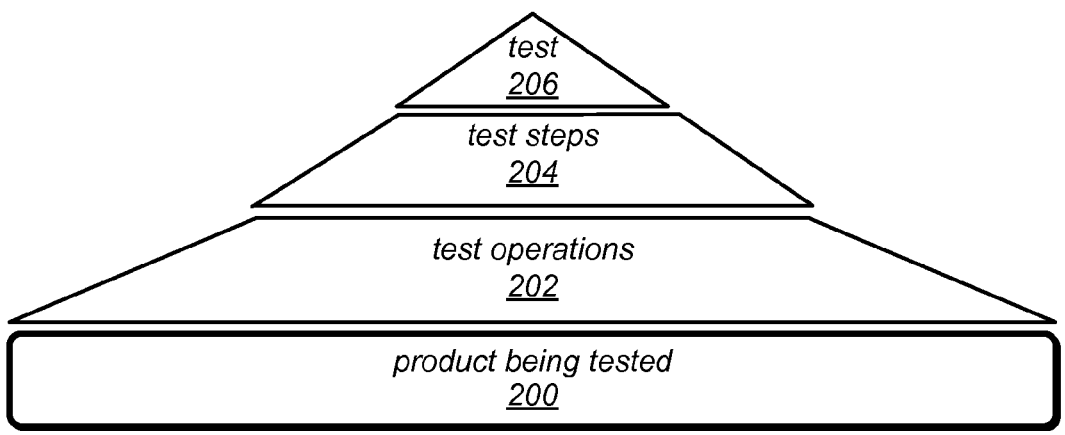
FIG. 2 is a block diagram illustrating the relative percentage of a test that is likely to need modification when a product being tested is modified, according to one embodiment.

FIG. 2 is a block diagram that illustrates (graphically) the relative percentage of a test that is likely to need modification when a product being tested is modified (when using this layering approach to test development), according to one embodiment. In this example, a test 206 for testing one or more features of a product 200, may include two or more test steps 204, and each of the test steps 204 may include one or more test operations 202. As illustrated in this example, the percentage of the test operations 202 that may need to be modified in response to a change in a product 200 that is being tested may be much higher than the percentage of the test steps 204 that may need to be modified in response to such a change. For example, the test operations 202 may be used to exercise and/or verify low-level implementation details of a product feature, while test steps 204 may be used to exercise and/or verify intermediate level implementation details of a product feature (e.g., verifying collections of low-level functions, each of which may be individually verified by test operations 202 with little, if any, additional effort on the part of test steps 204). Similarly, the percentage of a test 206 (which includes any number of test steps 204) that may need to be modified in response to a change in a product 200 being tested may be much less than the percentage of the test steps 204 (and/or test operations 202) that may need to be modified in response to such a change. Again, a test 206 may be used to exercise and/or verify the highest-level implementation details of a product feature, (e.g., verifying the collection of test steps 204, without needing to verify the detailed implementation of those test steps 204 or the underlying test operations 202). Test architectures that include such multi-level abstractions are described in more detail below, according to various embodiments.

In some embodiments, the test architecture described herein may use multiple layers of abstraction that build on top of each other. For example, in some embodiments, tests designed for use with the test framework architectures described herein may include three layers of abstraction that build on each other. These layers of abstraction may build on each other using composition (i.e. as building blocks), rather than using inheritance (as in the inheritance in an object-oriented programming language). In such an architecture, when there is a clearly defined application program interface (API) for the problem space (i.e. for a product or group of products to be tested), the operations layer may be required to stay in step with any changes in the API (or elements thereof), while there may be fewer situations in which the test steps or the test-level code need to be modified.

As previously noted, in some embodiments, tests may be designed using the following three levels of abstraction:

Test operations: As used herein, the term "test operations", or merely "operations" may refer to wrappers that abstract the lowest-level features of one or more products to be tested. For example, they may wrap application programming interface elements of one or more products, or may wrap the features exposed by user interface elements of one or more products, in some embodiments. In one specific example, in a "notepad" type application, some of the test operations may be operations to test the user interface elements for the functions Select-File-Save (which, when selected, may initiate a file saving operation and open an appropriate dialog box), Type-Filename-in-Save-Box (which may receive user input in a dialog box), and Click-Save (which may initiate the saving of a specified file). In various embodiments, low-level verification checks may be built into various test operations in this layer to invoke and verify the correct operation of the corresponding features of the notepad application. For example, a verification check may be included in a test operation for the Select-File-Save function to determine whether an appropriate dialog box was opened in response to its selection.

Test steps: A used herein, the term "test step", or merely "step", may refer to a building block of a test composed of any number of test operations. In some embodiments, each test step may include two or more test operations to be executed sequentially and in a particular order. For example, a test step for testing saving a file in the notepad application described above may consist of the following operations: 1. Select-File-Save (which initiates a file saving operation and opens an appropriate dialog box), 2. Type-Filename-in-Save-Box (which receives user input in the dialog box opened by the previous operation), and 3. Click-Save (which initiates the actual storing of the file using the name entered in the dialog box during the previous operation). By using test operations as building blocks, any low-level verification checks of the test operations are automatically provided for the test step for "saving a file" for free. In some embodiments, one or more mid-level verification checks may be built into various test steps in this layer to verify the correct operation of corresponding features of the product being tested that are not verified by checks built into the operations making up the test step.

Tests: In various embodiments, a test may be composed of any number of test steps in one or more intermediate levels of abstraction within the test. In some embodiments, high-level verification checks may occur at the test layer to verify the correct operation of a collection of steps, e.g., to test any features provided by their combination that are not already tested by the low-level verification checks in the test operation layer or the mid-level verification checks in one or more intermediate layers of test steps. In some embodiments, when using test steps (which in turn use test operations) as building blocks, any low-level verification checks of the test operations or mid-level verification checks of the test steps are automatically provided for the test, which may greatly reduce the number of verification checks needed at the test layer.

One embodiment of a method for developing tests using the abstractions described above is illustrated in FIG. 3. As illustrated at 310, in this example, such a method may include developing operations-level wrappers around elements of a product API to be tested. In some embodiments, if the product to be tested is a web service, each test may run as a client application that exercises the components of the web service by calling different functions provided to users through an exposed API. In such embodiments, operations-level wrappers may be developed to abstract an API of a web services application or another feature exposed by a user interface of a web services application, such as those described above. As illustrated at 320 in FIG. 3, the method may include developing one or more low-level verification checks for each of these operations. A verification check developed at the operations level may check a response returned after exercising a particular API to determine whether it produced the expected result, may check the status of an operation, or may check a value stored at a target of the API following the exercising of the API. For example, for the Select-File-Save operation described above, an operations level verification check may be developed to determine whether the appropriate dialog box opened in response to invocation of this feature. The operations level verification check may be configured to invoke the Select-File-Save API using input parameter values specified for the operation, check to see whether the appropriate dialog box was opened, and return a response that indicates success or failure (with or without including other response parameter values). In this example, other operations level verification checks may be developed for testing the Type-Filename-in-Save-Box operation and/or the Click-Save operation described above.

As illustrated at 330, in this example, the method may include developing one or more test steps, each of which is composed of any number of operations. Using the example above, a test step for testing all of the activities that would be performed in order to save a file may include the three test operations described above (e.g., Select-File-Save, Type- Filename-in-Save-Box, and Click-Save). As the file saving test step executes each of these operations, their operations level verification checks will be automatically performed, since they are part of the code for those operations. Therefore, the test step itself may not need to include any operations level checks. However, as illustrated at 340, the method may include developing one or more mid-level verification checks for each test step to verify the correctness of any result of this combination of test operations that is not already verified by the verification checks in the test operations making up the test step.

The test development method described herein may include developing a particular test for a product (e.g., a web services application), which may be used to exercise one or more high-level features of the product, by combining any number of test steps into the particular test, as in 350. Using the example above, a given test may exercise the file saving feature above as part of an exercise designed to exercise all of the functions provided through the user interface of a web services application, or to exercise all of the functions provided through the file menu portion of a web services application. As illustrated at 360 in FIG. 3, additional test-level verification checks may be developed to verify the correctness of a result of the combination of features or functions tested by the test steps of the test (or operations thereof) that will not be automatically checked by any of the low-level verification checks performed at the operations level or by any of the mid-level verification checks performed the step level when the test is executed.

Figure 3:
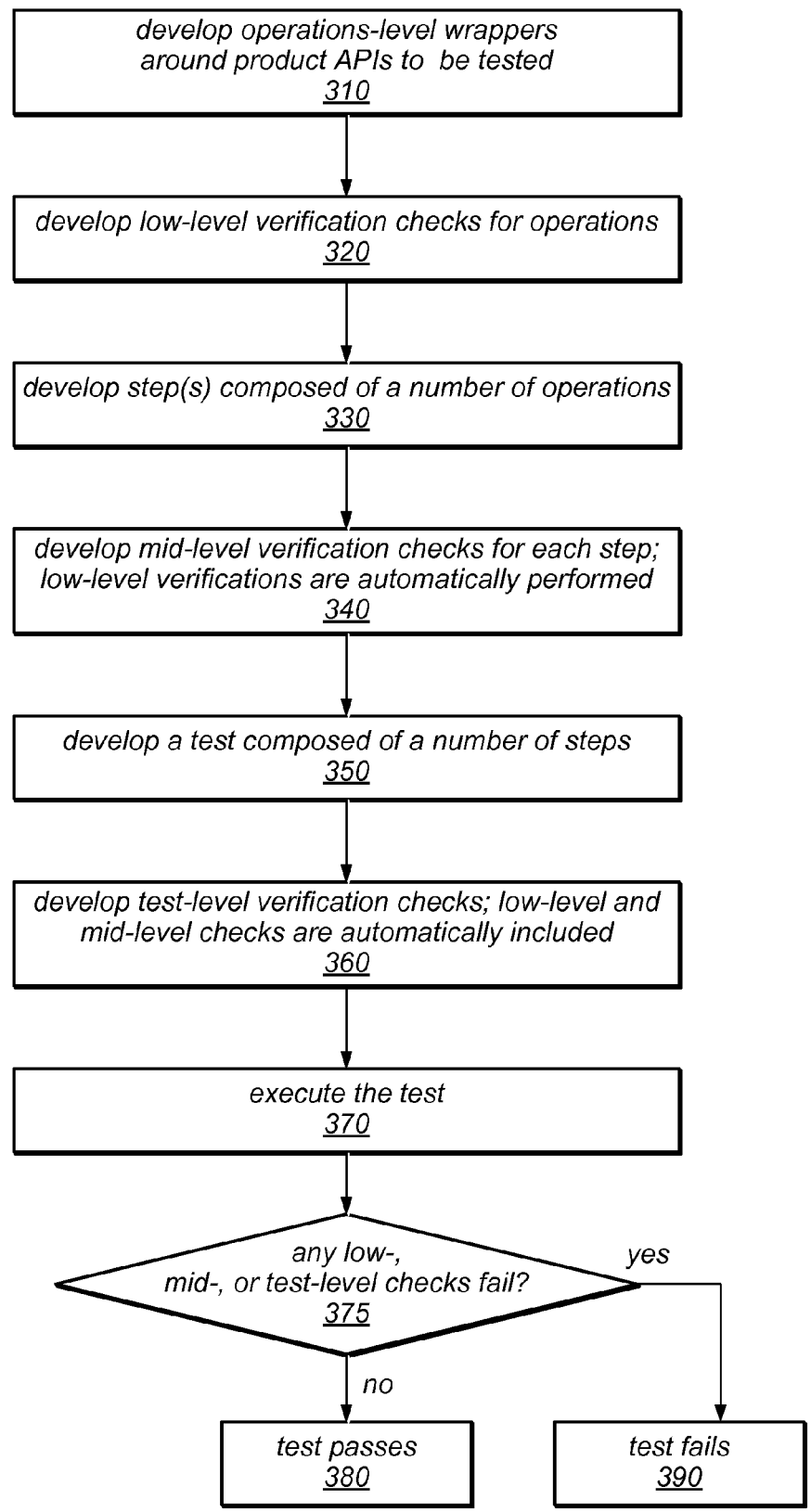
FIG. 3 is a flow diagram illustrating one embodiment of a method for developing tests using multiple levels of abstraction, as described herein.

As illustrated in FIG. 3, once a test has been developed, it may be executed (as in 370) to exercise and verify the targeted product features. If any low-, mid-, or test-level verification checks fail, shown as the positive exit from 375, the test may fail, as in 390. If none of the low-, mid-, or test-level verification checks fail, shown as the negative exit from 375, the test may pass, as in 380. Note that in some embodiments, if any low-, mid-, or test-level verification checks fail, the test may not complete normally, but may instead be terminated early. In other embodiments, if any low-, mid-, or test-level verification checks fail, the test may complete normally, even though it may return a response or store result data indicating a failing result.

Figure 4:
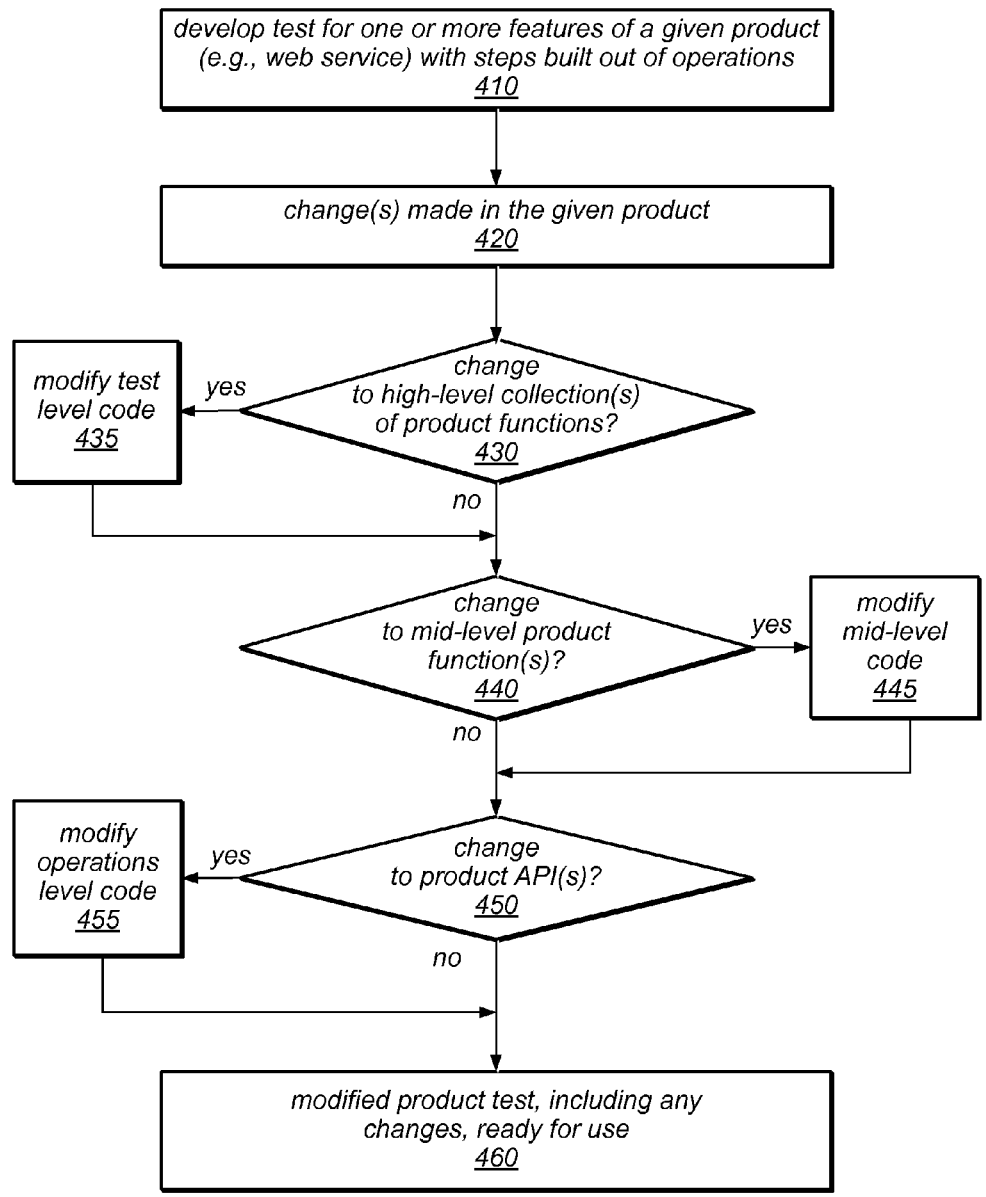
FIG. 4 is a flow diagram illustrating one embodiment of a method for modifying a test built using multiple levels of abstraction in response to a change in the product being tested.

As noted above, this test architecture (i.e. a test architecture in which tests are built using multiple levels of abstraction) may make it easier to modify tests when implementation details of the product being tested change. For example, using this approach, it may only be necessary to modify the code at one of the lower levels of abstraction in a test in response to a product change without having to modify the code at any higher levels of abstraction in the test. This may be especially true when low-level implementation details of the product change, e.g., when there are changes to the API or to an underlying communication protocol. FIG. 4 illustrates one embodiment of a method for modifying a test built using the abstractions described above in response to a change in the product being tested. As illustrated in this example, such a method may include developing a test for one or more features of a given product (e.g., a web service) as a collection of test steps, each built as a collection of test operations, as in 410. At some point, one or more changes may be made in the given product, as in 420. In response to that change, the test developer may need to modify the test in some way. If there is a change is to one or more high-level collections of product features, shown as the positive exit from 430, the method may include modifying the code at the test level, e.g., by modifying one or more calls and/or one or more test-level verification checks, as in 435. Using the example above, if the test is directed to testing all of the functions provided by a file menu and the menus are changed, the test developer may need to modify the test to call different test steps than before the change and/or may need to modify a test level verification to take into account any different or additional checks that should be made at the test level to verify the functionality of the changed file menu.

If a change is made to a mid-level product function, shown as the positive exit from 440, the method may include modifying the mid-level code, e.g., by modifying one or more calls and/or one or more mid-level verification checks, as in 445. Using the example above, if the product is changed such that saving a file involves different operations than the Select-File-Save, Type-Filename-in-Save-Box, and Click-Save operations described above, the test developer may need to modify the test step to call different test operations than before the change, and/or may need to modify one or more mid-level verification checks to take into account any different or additional checks that should be made at the step level to verify the functionality of the changed combination of operations for the step. In this case, the test developer may not need to change anything at the test level, since the high-level feature (saving a file) still exists in the product and needs to be tested. Since the implementation details for this feature are abstracted away at the test level, changes below this level may not affect any verification checks at the test level.

If a change is made to one or more product APIs, shown as the positive exit from 450, the method may include modifying the low-level code, including one or more calls and/or low-level verification checks (e.g., operations-level verification checks), as in 455. Using the example above, if the product is changed such that one or more of the Select-File-Save, Type-Filename-in-Save-Box, and/or Click-Save operations described above should be implemented using new or modified code, new or modified request or response parameters, or a new or modified communications protocol, the test developer may need to modify the code appropriately, and/or modify one or more low-level verification checks to take into account any different or additional checks that should be made at the operations level to verify the functionality of the new or modified operation code. In this case, the test developer may not need to change anything at the test level, since the high-level feature (saving a file) still exists in the product and needs to be tested. Similarly, the test developer may not need to change anything at the step level (e.g., in the mid-level calls and verification checks), since the modified operations may be automatically called by the step and their new low-level verification checks may be automatically applied. Since the implementation details for these operations are abstracted away at the test level and at the step level, changes made below these levels may not affect the verification checks that need to be performed at these higher levels of abstraction. Once any of the above changes are made, the modified product test may be ready for use, as in 460.

The techniques described above may be further illustrated by the following detailed example. Suppose that a provider of web-based e-commerce services has a system that allows third-party merchants (which may be referred to herein as "sellers") to create their own marketplaces accessible through its web service. In this example, inside each marketplace, the seller can create releases. In this example, the term "release" may refer to a group of configuration files (e.g., in a markup language, such as HTML or XML) that will be read by a service provider (which may be referred to as a "service owner") when operating on this marketplace. In this example, the XML code in the configuration files may need to conform to schemas uploaded by service owners, and these schemas may match the path of the configuration files, but may be in a different partition of the web service that is handling this release.

In this example, in order to test a seller's ability to upload a configuration from scratch, the seller may need to develop a test that tests the following steps (expressed below in plain English):

Upload the schema against which the configuration will be validated
Create a marketplace
Create a release inside the marketplace
Create a configuration inside the release When using the test architectures described herein, it may be possible to have a straightforward mapping between such an "English" description and the test steps taken in a test written to test their combination. In this example, the code at the test level may look similar to the pseudo-code below. As shown in this example, code at the test level may include little or no specification or indication of the low level implementation details:

```
class ConfigTests {
    private final ServiceOwnerSteps  service Owner = ...;
    private final SellerSteps        seller       = ...;
    public void uploadConfigFromScratch(String path,
        Schema schema, Config config) {
        serviceOwner.uploadSchema(path, schema);
        String marketplaceId = seller.createMarketplace( );
        String releaseId = seller.createRelease(marketplaceId);
        seller.uploadConfig(marketplaceId, releaseId, path, config);
    }
}
```

In this example, serviceOwners and sellers are the test steps objects. Note that in this example, no error checking is necessary at the test level. Instead, the test steps and/or test operations thereof are responsible for determining if the test operations and/or test steps have passed, and to throw an exception or error indication if they have not. Therefore, in this example, there may be no need to have complicated error checking logic in the test layer that would have to be refactored later if things changed, such as:

String marketplaceId=seller.createMarketplace( ) ;
if (null==marketplaceId) throw . . . //this code may not be necessary The use of multiple levels of abstraction used in this example, and the use of these techniques in general, may imply that it is up to the objects that perform the test operations to understand what it means for the operation to "succeed" or "fail". However, in some embodiments, in order to provide for flexibility of tests, some or all steps and/or operations may offer overrides that take an extra parameter. For example, if the test developer expects a given method to fail, based on the input conditions and/or parameters, an extra parameter may be used to specify the kind of failure that is expected, and the operation may "succeed" if the method fails in the expected manner.

As illustrated in the example above, a test step may consist of any number of test operations. For example, the createMarketplace( ) test step may include test operations for verifying the correct operation of the following functions: authenticating a new session, requesting creation of a marketplace in an asynchronous manner, waiting until the status of the marketplace changes from "Pending" to "Created", and then returning the marketplace Id for the newly created marketplace. As shown in this example, at the test level, the code does not need to know that all of these test operations need to be performed; it simply needs to include the higher-level test steps needed to create a marketplace. Therefore, the logic for actually implementing the steps necessary to create a marketplace may be pushed down to the intermediate level of abstraction (i.e. the test step layer). In this example, the logic for implementing the test step createMarketplace may be similar to that included in the example pseudo-code below. Note that in the example pseudo-code below, operation objects are not reused (e.g., to simplify multithreading) and a new instance of an operation may be created per operation. In other embodiments, operation objects may be reused.

```
class SellerSteps {
    private final OperationFactory operationFactory = ...;
    private final Credentials     credentials      = ...;
    public String createMarketplace( ) {
        MyAppResponse response;
        response =
            callOperation(operationFactory.authenticateNewSession
            (credentials));
        String authentication = response.getAuthentication( );
        response =
            callOperation(operationFactory.startCreateMarketplace
            (authentication));
        String marketplaceId = response.getMarketplaceId( );
        response =
            callOperation(operationFactory.getMarketplaceStatus
            (marketplaceId));
        while (response.getMarketplaceStatus(marketplaceId) ==
            MarketplaceStatus.Pending) {
            sleep with timeout . . .
            response =
                callOperation(operationFactory.getMarketplaceStatus
                (marketplaceId));
        }
        if (response.getMarketplaceStatus(marketplaceId) !=
            MarketplaceStatus.Created) {
            throw marketplace-couldn't-be-created-in-timeframe exception . . .
        }
        return marketplaceId;
    }
}
```

Note that, in this example, the code at this level still does not include the actual implementation details of the operations themselves. However, the code does include a breakdown of what it means to create a marketplace, in this example, i.e. there must be an authentication, a creation must be started asynchronously, then the code must wait until the status of the marketplace changes from Pending to Created (or until a specified timeout period has passed).

As shown in this example, the test operations may have the actual low-level knowledge of how to perform a specific task. For example, in a RESTful implementation of a target product, a StartCreateMarketplace( ) operation might need to perform a POST to a specific endpoint with a specific path, with an authentication string in the headers, and perhaps with a body that describes the type of marketplace to be created. The StartCreateMarketplace( ) operation may then expect the HTTP response code from the RESTful request to be "201 Created". In this example, the StartCreateMarketplace( ) operation may expect to find the marketplace Id in the location header of the HTTP response, or it may find the marketplace Id by parsing the response body. In this example, only the StartCreateMarketplace( ) operation may need to worry about these details. In the test steps, all the code may need to care about is that it is initiating a request to create a marketplace. Furthermore, the StartCreateMarketplace( ) operation may have the responsibility for throwing an exception if the web server was unavailable, if it did not return a 201 response code, or if it did not return a location Id for the marketplace that was created. Again, these are low level details that belong in the operations layer and no higher, in this example.

Note that an additional benefit that comes out of this layering of building blocks into multiple levels of abstraction within a test is that even the low-level test operations may choose different implementation paths (such as various paths that employ REST or SOAP or a custom-client package depending on the value of a switch or other test parameter) without affecting the test steps in which they are composed, or the tests in which the test steps are composed. The same test step and/or test may be used while varying the test operation implementation for one or more of the test operations included in a given test or test step thereof, increasing code coverage. In some embodiments, different paths may be taken at runtime using an inversion of control type switch, or a similar technique, without even needing to recompile the code.

Figure 5:
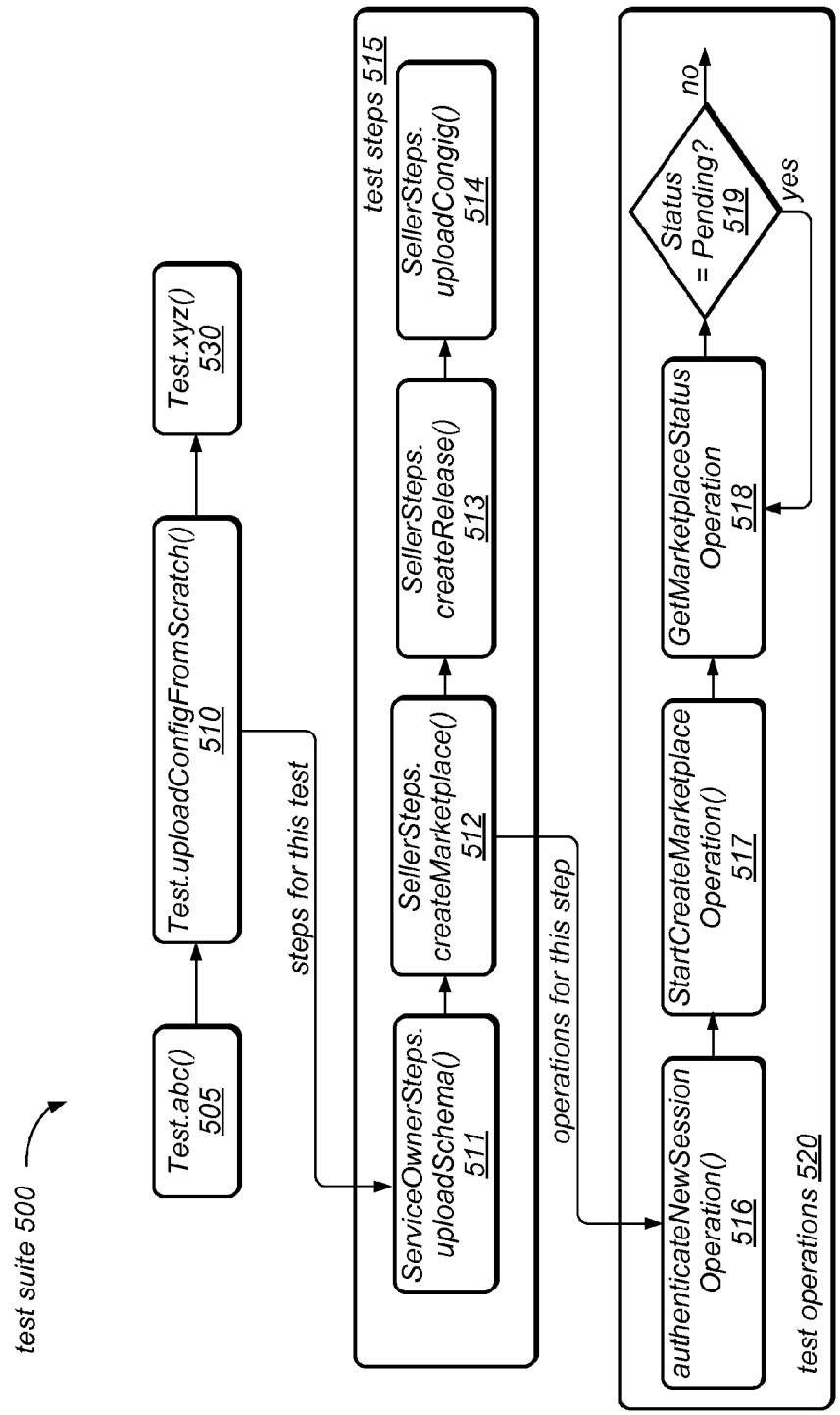
FIG. 5 is a block diagram illustrating a graphical expansion of a test into its test steps, and a test step into its test operations, according to one embodiment.

FIG. 5 illustrates an example of the graphical expansion of a test into its test steps, and a test step into its test operations, according to one embodiment. In this example, a test suite 500 includes three tests configured for testing various features and/or functions of a web service that allows sellers to set up their own marketplaces. Specifically, test suite 500 includes Test.abc (shown in FIG. 5 as 505), Test.uploadConfigFromScratch (shown in FIG. 5 as 510), and Test.xyz (shown in FIG. 5 as 530). In this example, Test.uploadConfigFromScratch 510 corresponds to the test uploadConfigFromScratch described in the example above, while Test.abc 505 and Test.xyz 530 are tests that exercise other functionality of the web service.

As described above, each test may include multiple test steps. As in the previous example, the test Test.uploadConfigFromScratch 510 includes a collection of four test steps 519, including one service owner step (uploadSchema 511), and three seller steps (createMarketplace 512, createRelease 513, and uploadConfig 514). As described above, each test step in a test may include multiple test operations. In this example, createMarketplace step 512 includes three operations: authenticateNewSession 516, StartCreateMarketplace 517, and GetMarketplaceStatus 518. In this example, createMarketplace step 512 includes additional code (shown at 519) that checks the status returned by GetMarketplaceStatus operation 518 and loops at this point in the test until the status is no longer Pending, e.g., until the status is Created, as described above. In this example, code to perform a step level verification check may be added to the step (not shown). For example a step level verification check could be configured to return an error code if the status is not changed to Created before a pre-determined timeout period expires. Note that any or all of the operations illustrated as part of the createMarketplace step 512 (e.g., authenticateNewSession 516, StartCreateMarketplace 517, or GetMarketplaceStatus 518) may include operations level verification checks that would be performed each time the test (and, thus, this step) is executed.

As previously noted, in order to be able to share test framework utilities across a large organization testing a diverse number of applications, in some embodiments the test framework described herein may be built using an orthogonal multi-tier architecture that splits the layers of abstraction of the tests described above, and that therefore offers one or more stand-alone sub-framework packages that anyone in an organization can plug into at any level.

In some embodiments, the test framework architecture described herein may include a parent layer (which may be referred to as the TestFramework layer), which may provide the generic objects and utilities needed by any test framework, regardless of what is being tested (e.g., a UI, a web front end, a web back end, a console application, etc). Functionality that is generally applicable in any testing situation, such logging, verification, configuration/test data fetching, performance counters, etc, may be provided at this layer. In some embodiments, the heart of the test framework may be a TestOperation class. Objects of the TestOperation class may receive a TestOperationRequest as input and may include a call( ) function that returns a TestOperationResponse. For example, the call( ) function of an object of this class may invoke an API or other low-level functional element of a product being tested in order to exercise its features. In some embodiments, an instance of a TestOperation may be created for every operation that is executed, making its use inherently thread safe.

Figure 6:
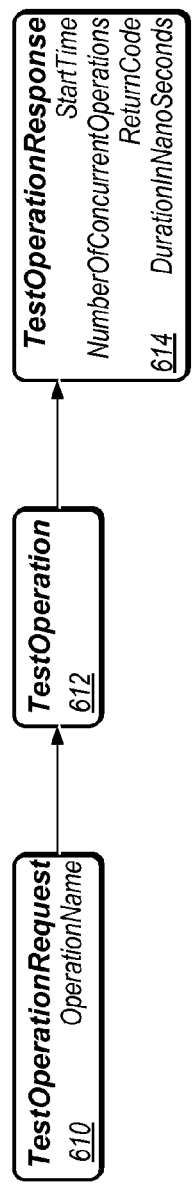
FIG. 6 is a block diagram illustrating the functionality of objects of a generic test operation object class, according to some embodiments.

FIG. 6 is a block diagram illustrating the functionality of objects of such a TestOperation class, according to some embodiments. As illustrated in this example, a TestOperationRequest 610 may specify an OperationName. In response to receiving the request, a TestOperation object 612 may execute its function call (which may correspond to, and may exercise, a product feature specified by the OperationName) and may return TestOperationResponse 614. In this example, TestOperationResponse 614 includes values for four response parameters: the start time, the number of concurrent operations, a return code, and the duration of the function call in nanoseconds. In other embodiments, the generic test routines provided by objects of a low-level TestOperations class may include more, fewer, or different request or response parameters than those illustrated in FIG. 6. In some embodiments, each object of a TestOperation class may exhibit functionality similar to that illustrated in FIG. 6.

Note that for some tests (or test domains), a client to the test framework (sometimes referred to herein as a "test client") may choose to plug into the test framework hierarchy at this lowest level. For example, if a given test does not need to test functions at any level higher than this level, there may be no need to bring in additional functionality or APIs of other levels that would be extraneous or that could potentially pollute the problem space. In such cases, the test client may plug into a standalone sub-framework package (i.e. one that is an executable entity distinct from any other sub-framework packages of the test framework hierarchy) that includes objects of the TestOperation class.

In some embodiments, in order to incrementally build the test framework, one or more other packages may be derived from the sub-framework package that includes objects of the TestOperation class. These derived sub-framework packages may include object of classes that are more specific to the target domain. For example, one such package (a UITestFramework package) may include operations that wrap objects of the TestOperation class in order to access features of the target product through its user interface elements. Another example may be an HttpTestFramework package that wraps low-level operations objects of the TestOperaton class with operations that communicate with the target product using HTTP requests and responses. In some embodiments, an advantage of this layering approach may be that the generic test framework routines of the TestOperation class objects do not need to be reinvented for the UITestFramework or the HttpTestFramework. Instead, they may simply be inherited. Since the generic test routines of the TestOperation class objects may be shared across multiple test frameworks, code duplication may often be avoided. In addition, multiple testing teams may benefit from any bug fixes applied to the generic routines, which may reduce overall test maintenance costs within a large organization. In some cases, the use of the layering techniques described herein may also result in much smaller incremental test framework deployments. For example, in embodiments in which each sub-framework may be deployed as a standalone binary, the overall test framework binary may not need to be changed very often.

In some embodiments, sub-framework packages at a domain-specific or application-type-specific operations layer may offer Web utilities such as a variety of RESTful drivers, HTML and XML parsing utilities, etc. Such a package may wrap around the packages of objects of operation classes in a previous layer of the test framework hierarchy (e.g., an HttpTestFramework package).

Figure 7:
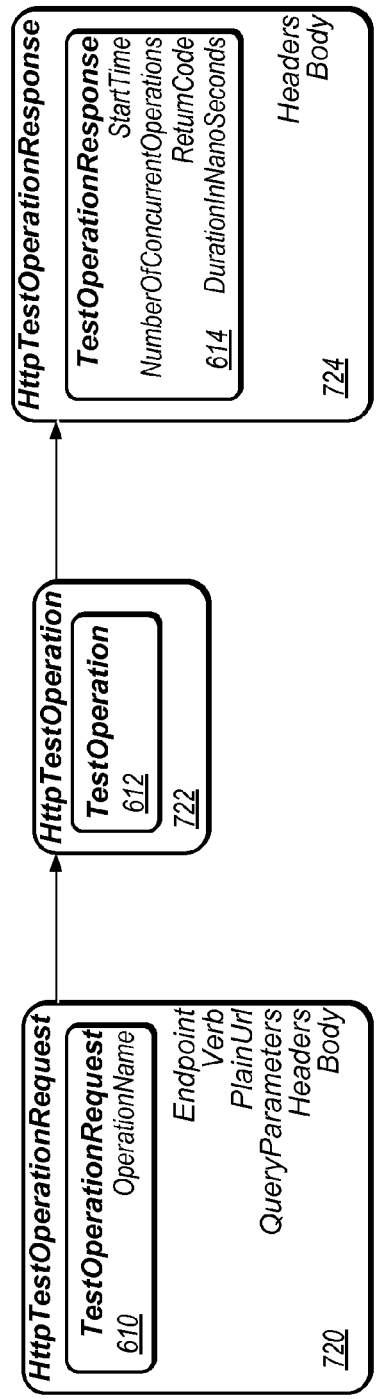
FIG. 7 is a block diagram illustrating the functionality of objects of an application-domain-specific operation object class, according to some embodiments.

FIG. 7 is a block diagram illustrating the functionality of objects of an HttpTestOperation class, which may be considered an application-domain-specific object class, according to some embodiments. As illustrated in this example, an HttpTestOperationRequest 720 may inherit the functionality of TestOperationReqest 610, and may specify an OperationName. In addition, the HttpTestOperationRequest 720 may include various input parameter values, such as an endpoint to which the HTTP request should be made, a verb for the request (e.g., put or get), a plain URL, one or more query parameters, various headers (e.g., an HTTP request header), and/or a request body (e.g., an HTTP request body). In response to receiving the request, an HttpTestOperation object 722 may execute its function call (which may include a call to a function of a TestOperation 612) and return HttpTestOperationResponse 724. As illustrated in this example, an HTPTestOperationResponse 724 may inherit the functionality of TestOperationResponse 614, and may include various response parameter values defined by the TestOperation object class. In addition, HttpTestOperationResponse 724 may include additional response elements, such as one or more headers (e.g., an HTTP response header) and/or a response body (e.g., an HTTP response body). In some embodiments, each object of an HttpTestOperation class may exhibit functionality similar to that illustrated in FIG. 7. Note that in other embodiments, the routines provided by objects of an application-domain-specific object class may include more, fewer, or different request or response parameters than those illustrated in FIG. 7. As noted above, tests for a variety of different applications and/or features thereof may leverage these objects of the test framework if they are directed to the targeted application domain (e.g., an HTTP application domain).

In some embodiments, an application-domain-specific sub-framework package, such as the HttpTestFramework package described above, may be inherited by either another intermediate layer of test framework hierarchy or by an application-specific sub-framework. In this way, multiple test frameworks built for testing web services may use these routines (again avoiding code duplication, befitting from bug fixes in shared routines, and/or resulting in smaller incremental deployments). As with the previous layer in the test framework hierarchy, for some test domains, a test client to the framework may choose to plug into the test framework hierarchy at the application-domain-specific level or at the application-specific level. If a given test does not need to test functions at any level higher than this level, there may be no need to bring in additional functionality or APIs of other levels that would be extraneous or that could potentially pollute the problem space. In such cases, the test client may plug into a standalone sub-framework package (i.e. one that is an executable entity distinct from any other sub-framework packages of the test framework hierarchy) that includes objects of one such application-domain-specific operation class (such as the HttpTestFramework package described above) or an application-specific sub-framework package. An application-specific framework may in some embodiments be shared by any number of applications of a similar type (e.g., to provide utilities such as specific functional tests, load generation, etc).

Figure 8:
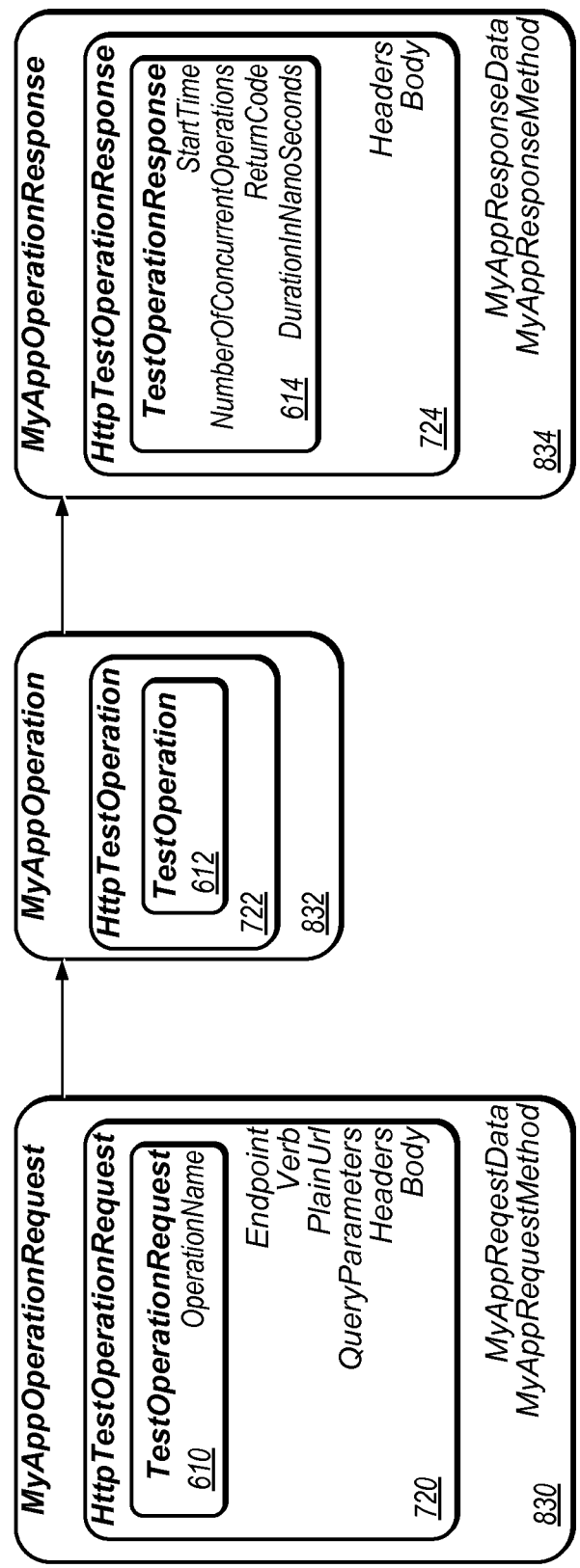
FIG. 8 is a block diagram illustrating the functionality of objects of an operation object class for a specific application or application type, according to some embodiments.

FIG. 8 is a block diagram illustrating the functionality of objects of an object class for a specific application (or application type, such as web services applications), according to some embodiments. As illustrated in this example, a request of the type MyAppOperationRequest (shown as 830) may inherit the functionality of both a domain-specific operation request (such as HttpTestOperationRequest 720), and a generic operation request (such as TestOperationReqest 610), and may specify an OperationName and/or any of the input parameter values inherited from the domain-specific operation request (e.g., an endpoint, a verb, a plain URL, one or more query parameters, various headers, and/or a request body). In addition, the application-specific request MyAppOperationRequest 830 may include additional input elements, shown in FIG. 8 as MyAppRequestData and MyAppRequestMethod. In response to receiving the request, an application-specific object, shown as MyAppOperation object 832 may execute its function call (which may include a call to a function of HttpTestOperation 722 and, in turn, a function of TestOperation 612) and may return MyAppOperationResponse 834. As illustrated in this example, MyAppOperationResponse 834 may inherit the functionality of HttpTestOperationResponse 724 and TestOperationResponse 614, and may include various response parameter values defined by the HttpTestOperation object class and the TestOperation object class. In addition, MyAppOperationResponse 834 may include additional response elements, shown in FIG. 8 as MyAppResponseData and MyAppResponseMethod. In some embodiments, each object of a MyAppOperation class may exhibit functionality similar to that illustrated in FIG. 8. Note that in other embodiments, the routines provided by objects of an application-specific object class may include more, fewer, or different request or response parameters than those illustrated in FIG. 8. As noted above, in some embodiments tests for a variety of different applications and/or features thereof may leverage these objects of the test framework if they are targeted to a similar application or (in some cases) to an application of a similar application type.

Note that while the detailed example described above includes only three layers of inheritance within a test framework hierarchy (TestOperation to HttpTestOperation to MyAppOperation), in other embodiments, a test framework may be designed using any number of such layers. In embodiments that include additional layering, each of the standalone layers may offer no more and no less functionality than the next level of test applications requires.

Figure 9:
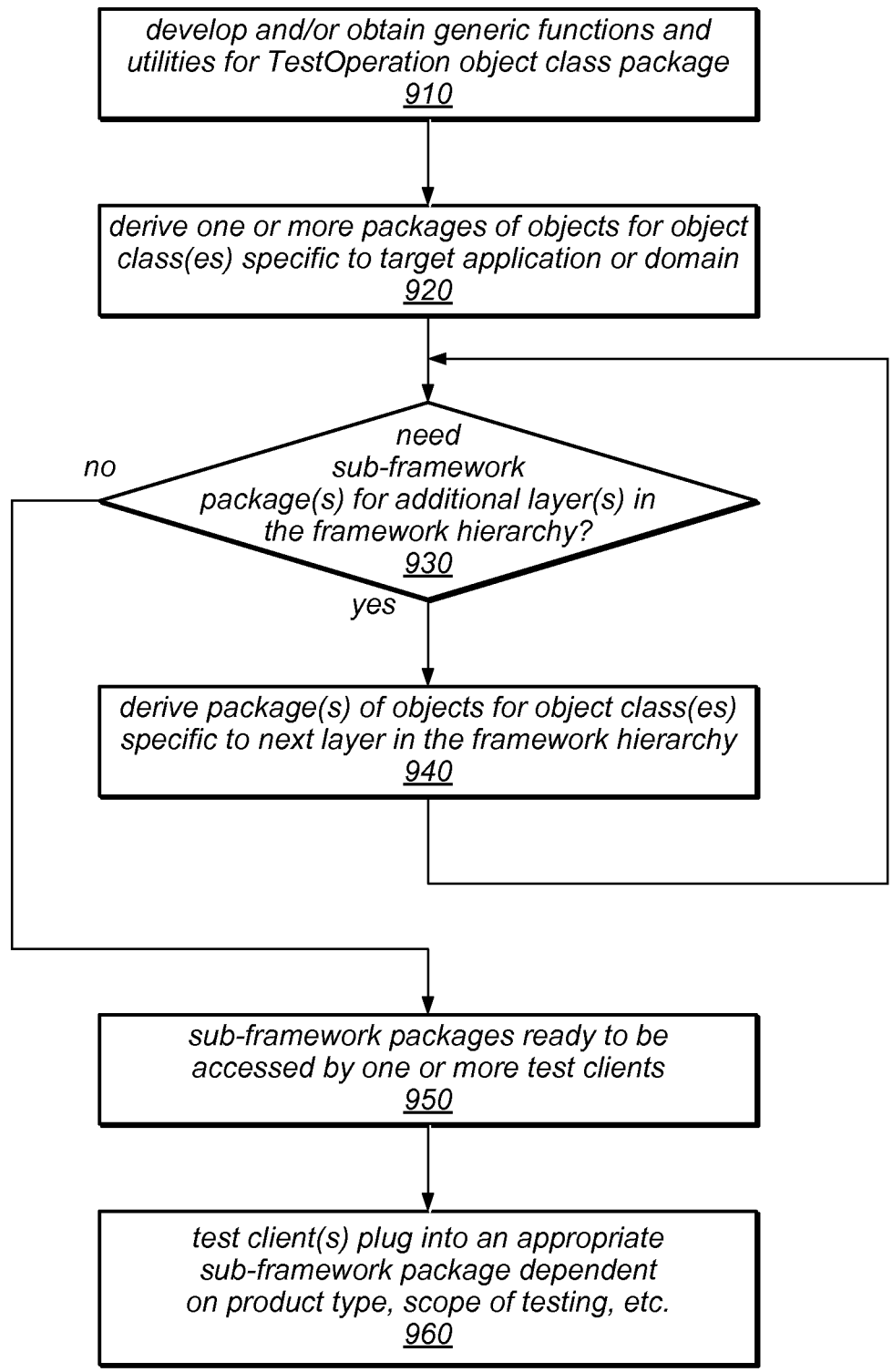
FIG. 9 is a flow diagram illustrating one embodiment of a method for incrementally building a test framework that includes two or more sub-framework packages, as described herein.

FIG. 9 illustrates one embodiment of a method for incrementally building a test framework that includes two or more sub-framework packages, as described herein. As illustrated at 910, in this example, such a method may include developing and/or obtaining generic test routines and/or utilities (e.g., routines and utilities useful in testing a variety of types of products) for a TestOperation object class package. For example, in various embodiments, some or all of the generic routines and utilities provided by a package of objects of the TestOperation object class may be obtained from a third party or from a database or archive of previously developed generic test routines and utilities. In other embodiments, some or all of the generic routines and utilities provided by a package of objects of the TestOperation object class may be developed from scratch for a particular test framework. In either case, once installed in the test framework, these generic routines and utilities may be accessed by different test teams and used to test common features of a variety of products, including, but not limited to, web services applications. In some embodiments, each of these objects may exhibit functionality similar to that described above.

As illustrated at 920, the method may include deriving one or more packages of objects for one or more object classes at a second layer in the test framework hierarchy. For example, the method may include deriving a package of objects for an application-specific sub-framework and/or deriving a package of objects for a domain-specific sub-framework, such as the packages for UI testing and/or HTTP testing described above (any of which may wrap a generic TestOperation object class, and any of which may be accessed at the second layer in the test framework hierarchy by a given test to implement an operation thereof). As previously noted, object classes derived from the TestOperation object class may inherit the functionality, characteristics, and/or behaviors of the TestOperation object class. For example, objects in these classes may inherit the generic test framework routines of the TestOperation class.

If any sub-framework packages are needed for any additional layers in the test framework hierarchy, shown as the positive exit from 930, the method may include deriving one or more packages of objects for one or more object classes specific to a sub-framework at a next layer in the test framework hierarchy, as in 940. Note that in various embodiments, any number of standalone sub-framework packages may be included at each one of any number of layers in the test framework hierarchy (not shown). At each additional layer in the test framework hierarchy, the additional object packages may be application-specific, or application-type-specific (such as a sub-framework package specific to testing "web services") and the objects of these packages may inherit generic routines of the test framework (e.g., the routines provided by objects at the TestOperation layer), of a second layer (e.g., routines of objects in a sub-framework package targeted to a given domain), and of any other intermediate layers in the test framework hierarchy.

If no additional sub-framework packages are needed, or once any needed sub-framework packages have been developed, the sub-framework packages of the test framework hierarchy may be ready to be accessed by one or more test clients, as in 950. As described herein, each test client may plug into the test framework hierarchy at any layer in the hierarchy, e.g., to access an appropriate sub-framework package, dependent on the application, application type, domain, scope of testing, etc., as in 960. Note that additional sub-framework packages may be added to the test framework hierarchy at a later time, e.g., on an as-needed basis.

Again note that FIG. 1 illustrates a test framework 100 built by layering standalone sub-framework packages on each other, as described above, and also illustrates that various teams may plug into that test framework at any of the layers. Using the example above, test framework 100 may include a sub-framework package at a given layer that includes objects of MyAppOperation class, and these objects may be used to implement test operations that are generic or reusable for testing a particular type of application (e.g., web services). In this example, a "StartCreateMarketplace" operation, as described above, may be built on this application-specific sub-framework, and may inherit one or more generic routines of the MyAppOperation class.

Figure 10:
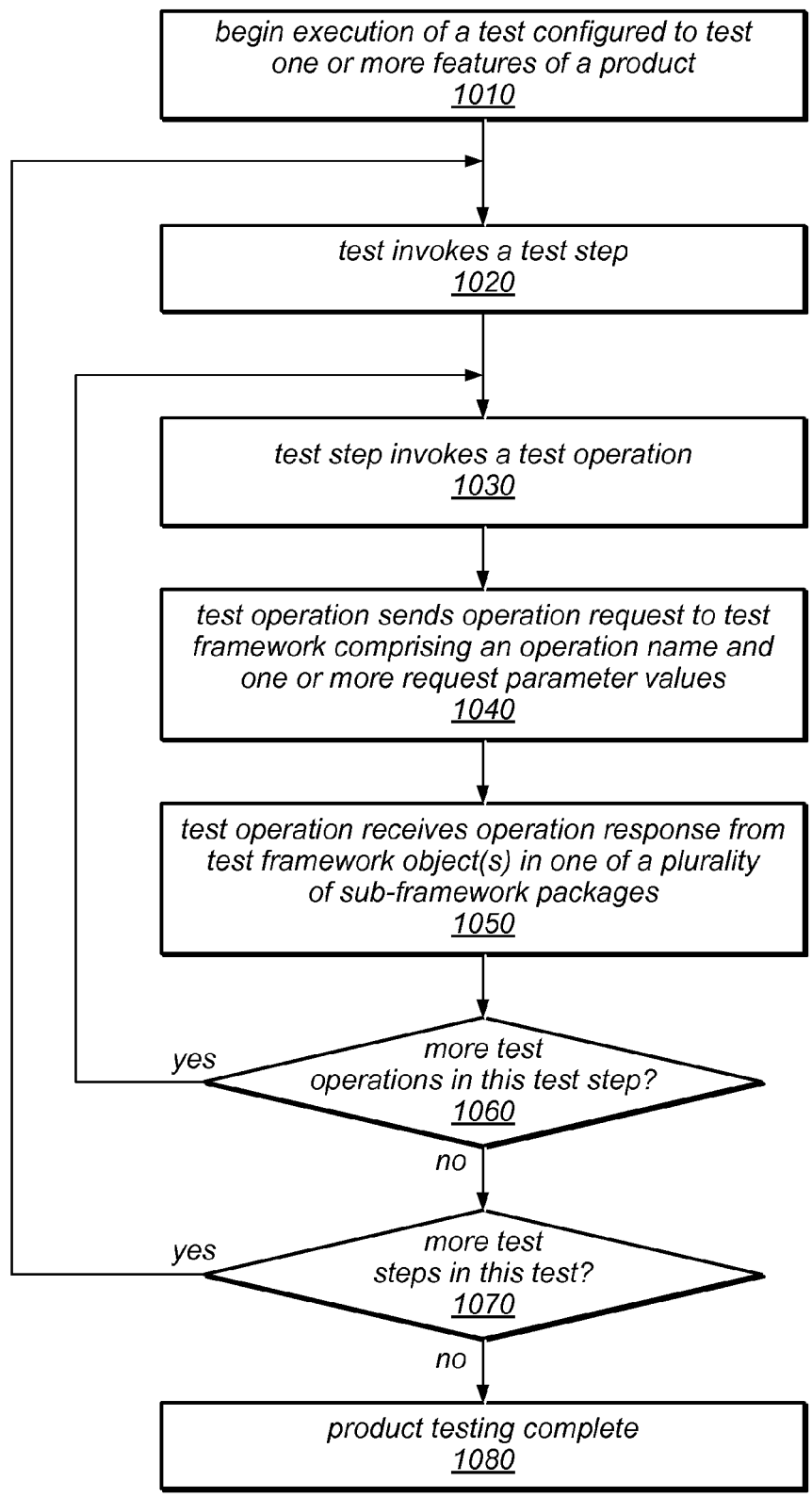
FIG. 10 is a flow diagram illustrating one embodiment of a method for accessing a test framework that includes a hierarchy of sub-framework object packages, as described herein.

FIG. 10 illustrates one embodiment of a method for accessing a test framework that includes a hierarchy of sub-framework object packages, as described herein, to test one or more features of a product (e.g., a web services application). As illustrated at 1010, in this example, such a method may include beginning execution of a test configured to test one or more features of a product (e.g., a web services application). In some embodiments, the test may be built using the multiple levels of abstraction described herein. For example, the test may include multiple test steps, each of which may include one or more test operations. In other embodiments, the test may be built directly from a collection of test operations. In the example illustrated in FIG. 10, the method may include the test invoking a test step, as in 1020, and the test step invoking a test operation, as in 1030.

As described herein, a test operation may be implemented using one or more objects of a test framework that includes object packages at any of multiple layers of the test framework hierarchy. As described herein, objects in different packages may wrap objects of other packages at a lower layer in the test framework hierarchy. For example, a test client may access one or more objects of a sub-framework package at a TestOperation layer, a domain-specific operation layer, an application-type-specific layer, an application-specific operation layer, etc., depending on which layer in the test framework hierarchy is appropriate for the application, application type, domain, scope of testing, etc. As illustrated at 1040 in FIG. 10, the method may include the test operation sending an operation request to the test framework, and the request may include an operation name and one or more request parameter values. Using the examples above, the test operation may send an operation request targeting a method of an object of a TestOperation class (such as TestOperationRequest 610 of FIGS. 6-8), an operation request targeting a method of an object of an HttpTestOperation class (such as HttpTestOperationRequest 720 of FIGS. 7-8), or an operation request targeting a method of an object of an application-specific test operation class (such as MyAppOperationRequest 830 of FIG. 8). The method illustrated in FIG. 10 for executing a test may include the test operation receiving an operation response from one or more test framework object(s) in one of two or more sub-framework packages that were used implementing the named operation, as in 1050. Using the previous example, it may receive a response from an object of a TestOperation class (shown as TestOperationResponse 614 in FIGS. 6-8), an object of an HttpTestOperation class (shown as HttpTestOperationResponse 724 in FIGS. 7-8), or an object of an application-specific test operation class (shown as MyAppOperationResponse 834 in FIG. 8).

If there are more test operations in the test step, shown as the positive exit from 1060, the method may include repeating the operations illustrated at 1030-1050 for each of those test operations (as shown in FIG. 10 by the feedback to 1030). Similarly, if there are more test steps in the test, shown as the positive exit from 1070, the method may include repeating the operations illustrated at 1020-1060 for each of the remaining test steps (as shown in FIG. 10 by the feedback to 1020). Once all of the test steps and their test operations have been executed, shown as the negative exit from 1070, the testing of the product by this test may be complete, as in 1080. Note that in some cases, one or more parameter values returned by the test framework (e.g., in the response returned at 1050) may cause a verification check at the test operations level, the test step level or the top level of the executing test to fail (not shown). In some embodiments, if this occurs, the test may not complete normally, but may instead be terminated early (e.g., without completing all of the loops from 1060 to 1030 or from 1070 to 1020 that are illustrated in FIG. 10). For example, an operation named in one of the operation requests sent to the test framework may throw an exception under certain conditions and/or may return an error code. A verification check of a test operation or test step (or even at the test level) may recognize the error code or exception as one from which the test cannot recover, and may cause the test to be aborted. In other embodiments, the test may be configured to continue executing all of the loops from 1060 to 1030 or from 1070 to 1020 until testing is complete, even if an error is observed by a verification check or an exception is thrown by one or more methods invoked by the test framework to exercise various features of the product (e.g., through its APIs). In such embodiments, the effects of any exceptions taken and/or any error codes returned may be handled and/or analyzed following the completion of the test.

Figure 11:
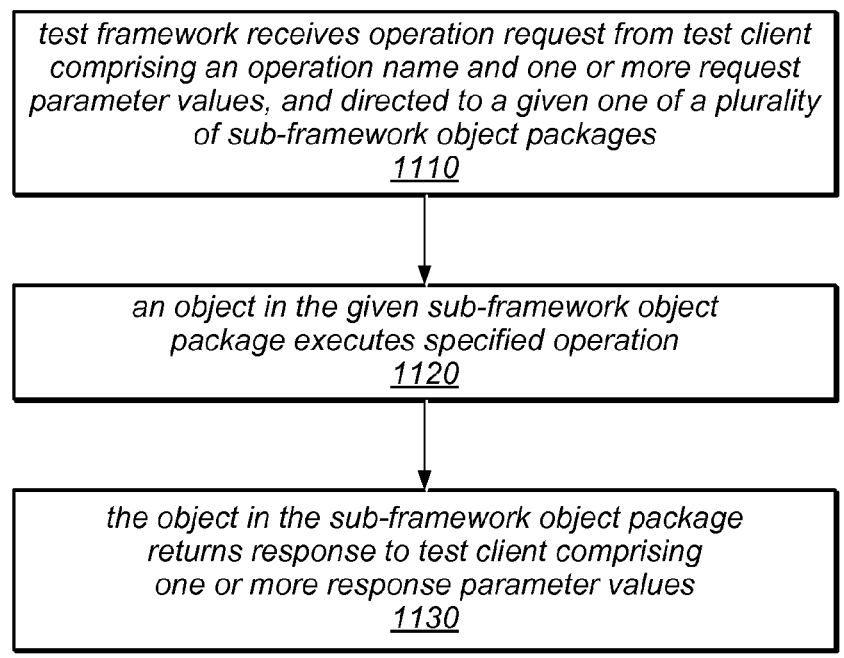
FIG. 11 is a flow diagram illustrating one embodiment of a method for a test framework to receive and respond to requests from a test client, as described herein.

FIG. 11 illustrates one embodiment of a method for a test framework to receive and respond to requests from a test client, as described herein. As illustrated at 1110, in this example, the method may include the test framework receiving an operation request from test client. As described herein, the operation request may include an operation name and one or more request parameter values, and it may be directed to a given one of two or more sub-framework object packages (e.g., depending on the layer within the test framework hierarchy at which the test client is plugged in). For example, the request may be directed to an application-specific sub-framework, or to a sub-framework at another layer in the test framework hierarchy (e.g., an application-type-specific sub-framework, such as a "web services" sub-framework package), and the objects in each of these sub-framework packages may inherit routines of a generic test framework package (e.g., at the TestOperation level), a package for a target domain, and/or packages at any other intermediate levels below the level to which the request is directed in test framework hierarchy. FIGS. 6-8 illustrate various examples of operation requests that may be directed to different layers in a test framework hierarchy, including TestOperationRequest 610 (in FIGS. 6-8), HttpTestOperationRequest 720 (in FIGS. 7-8), and MyAppOperationRequest 830 (in FIG. 8). Other operation requests may include values of more, fewer, or different request parameters than those illustrated in FIGS. 6-8.

As illustrated at 1120, in this example, the object in the given sub-framework object package may execute the named operation (e.g., by calling its function). For example, the object may invoke a method corresponding to the named operation that exercises a corresponding feature of a product under test (e.g., through one of its APIs). The object in the sub-framework object package may then return a response to the test client, as in 1130. As described herein, the response may include one or more response parameter values. FIGS. 6-8 illustrate various examples of responses that may be received from different layers in a test framework hierarchy, including TestOperationResponse 614 (in FIGS. 6-8), HttpTestOperationResponse 724 (in FIGS. 7-8), and MyAppOperationResponse 834 (in FIG. 8). Other operation responses may include values of more, fewer, or different response parameters than those illustrated in FIGS. 6-8.

Note that while many examples of the use of the test layering and test framework layering described herein are directed to tests and test frameworks for testing web services, these systems and techniques may be generally applicable for building and deploying tests and test frameworks for testing a variety of other types of products (or features thereof), including hardware products, software products, and products that are implemented using a combination of hardware and software elements. Note also that while in some embodiments, the techniques described herein for developing tests that include functionality and/or verification checks at multiple levels of abstraction may access routines in a test framework that is built using a hierarchy of standalone sub-framework packages (such as those described herein), in other embodiments tests written using the techniques described herein may access routines of a test framework that does not employ these sub-framework layering techniques. In still other embodiments, a test framework may employ the sub-framework layering techniques described herein, but may be accessed by tests that are not built using multiple levels of abstraction, as described herein (e.g., they may be accessed by "flat" tests, or by tests that exhibit a different type of hierarchical structure).

Note that in some cases, mid- or high-level verification checks may need access to low-level information in order to verify the correct operation of test step or collection of test steps in a test. In some embodiments, in order to accommodate this need, tests may include one or more observer pattern designs. For example, in some embodiments, an observer pattern may be used to specify a list of observer objects that are dependent on a subject object. Such observer patterns may be included in code for any level of the test framework hierarchy and may apply to a single object instance (in which case it may be referred to herein as a "singleton") or it may apply to all instances of a given object, or to all of the objects in a given class, e.g. all objects of a given sub-framework package. FIG. 12 illustrates an example observer pattern 1210 for an HttpTestFramework (e.g., for the objects in a sub-framework package at the HTTP domain layer in a test framework hierarchy), according to one embodiment. As illustrated in FIG. 12, a list of observers may be maintained using register( ) and unregister( ) methods, such as those illustrated in FIG. 12.

When the state of the subject object changes (e.g., when the state of an object in the HttpTestFramework package changes, such as when it completes), the registered observers may be notified by calling one of their methods. In the example illustrated in FIG. 12, calling a notifyObservers( ) method of the observer pattern may cause a notify( ) method to be called in each of the observers currently registered for objects in the HttpTestFramework package, as in 1220. In this example, the code for an object 1210 in the HttpTestFramework package may include a call to a register method for an HttpThrottlingObserver, shown in FIG. 12 as registerObserver(HttpThrottlingObserver). In this example, the code also includes calls to register, and then to unregister, a second observer (HttpFrameworkObserverB). In this example, a call to a notifyObservers( ) method is the last thing in the pattern, and may be called after any other methods of the HttpTestFramework objects have been called. This may indicate that this method is called only once for each object in this class, i.e. after completing all of its "work" using other methods. In other observer patterns, a notifyObservers( ) method may be called at different points by an object or may be called multiple times by an object or any of its methods (e.g., at state changes other than a change to the completion state).

In some embodiments, a base operation constructor in the test framework may take an array with any number of observers. Following the observer pattern, observers may be attached to or detached from operations at any given time. These observers may be notified in real time when the operation completes executing and can take any action desired, according to the methods provided in the corresponding observers. For example, observers may be configured to monitor and/or track various state changes, parameter values, operation responses, or other information collected at one level in the test framework hierarchy, and may store, log or otherwise make the collected information available to objects at other levels in the test framework hierarchy. In some cases, and for certain types of information, the collected information may be rolled up and aggregated as it goes up the inheritance chain.

As described herein, observer patterns may be used in some embodiments to provide higher-level objects with access to lower level objects while keeping them generally decoupled. Otherwise, the lower level objects may need to expose information that may run counter to good object-oriented design practices. The use of observer patterns may open up a variety of test design possibilities, as higher levels of the frameworks can create observers (e.g., often singleton observers) to keep track of specific statistics. For example, a singleton HttpThrottlingObserver at the HttpTestFramework level may in some embodiments be used to keep track of the percentages of throttled requests. Such an observer may be notified of the result of each HTTP operation at the end of the operation. If the response code is 503, for example, the observer could count this HTTP operation as a throttled operation; otherwise it could count this HTTP operation as a non-throttled operation. In this example, the observer may be configured to increment a counter when it determines that an HTTP operation was throttled. Another object (at any level in the test or test framework hierarchy) may query this counter in order to determine the number of throttled operations (e.g., at the end of a test run). In this example, the test may pass or fail depending on whether a pre-determined threshold on the allowable percentage of throttled operations is exceeded. Other observers may keep track of latency, data uploaded, data created, or other statistics, for example, by updating a counter, a variable, or another data structure, or by other means for recording observed data or state information, and/or cost, performance, or other execution-related metrics.

Figure 13:
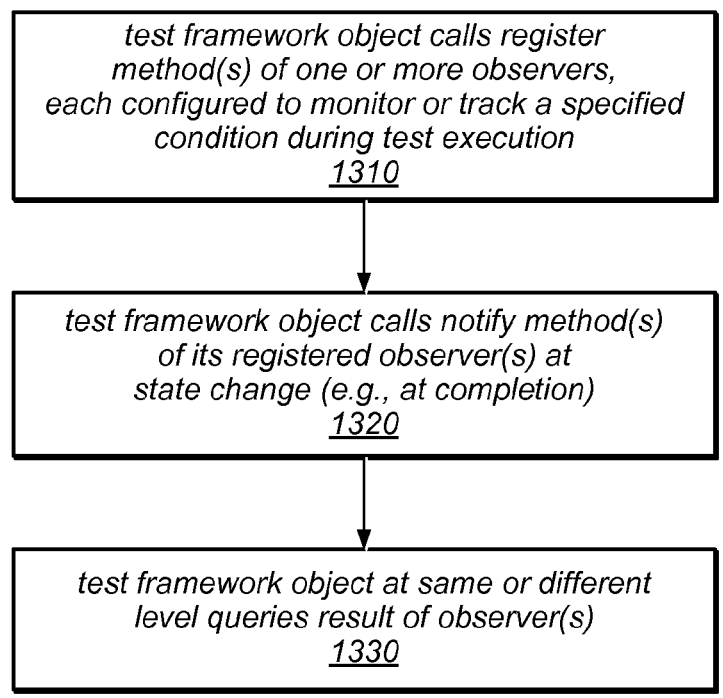
FIG. 13 is a flow diagram illustrating one embodiment of a method for using observers in the test and test framework architectures described herein.

FIG. 13 illustrates one embodiment of a method for using observers in the test and test framework architectures described herein. As illustrated at 1310 in FIG. 13, the method may include a test framework object calling the register methods of one or more observers, each of which is configured to monitor or track a specified condition during test execution. For example, one observer may be configured to increment a counter when the response from an HTTP operation includes a response code of 503, or when data is uploaded or created. The method may also include the test framework object calling the notify methods of its registered observers when its own state changes (e.g., at completion, and/or at one or more other state changes), as in 1320. As illustrated at 1330, in this example, this or another test framework object in the same or a different layer in the test framework hierarchy may query the findings of the observers, e.g., by reading a counter or a variable maintained by the observers. Again note that observers may be included in code for any level of the hierarchy and can apply to a single object instance, to all instances of a given object, or to all the instances of the objects in a given class, e.g. all objects of a given sub-framework package.

Figure 14:
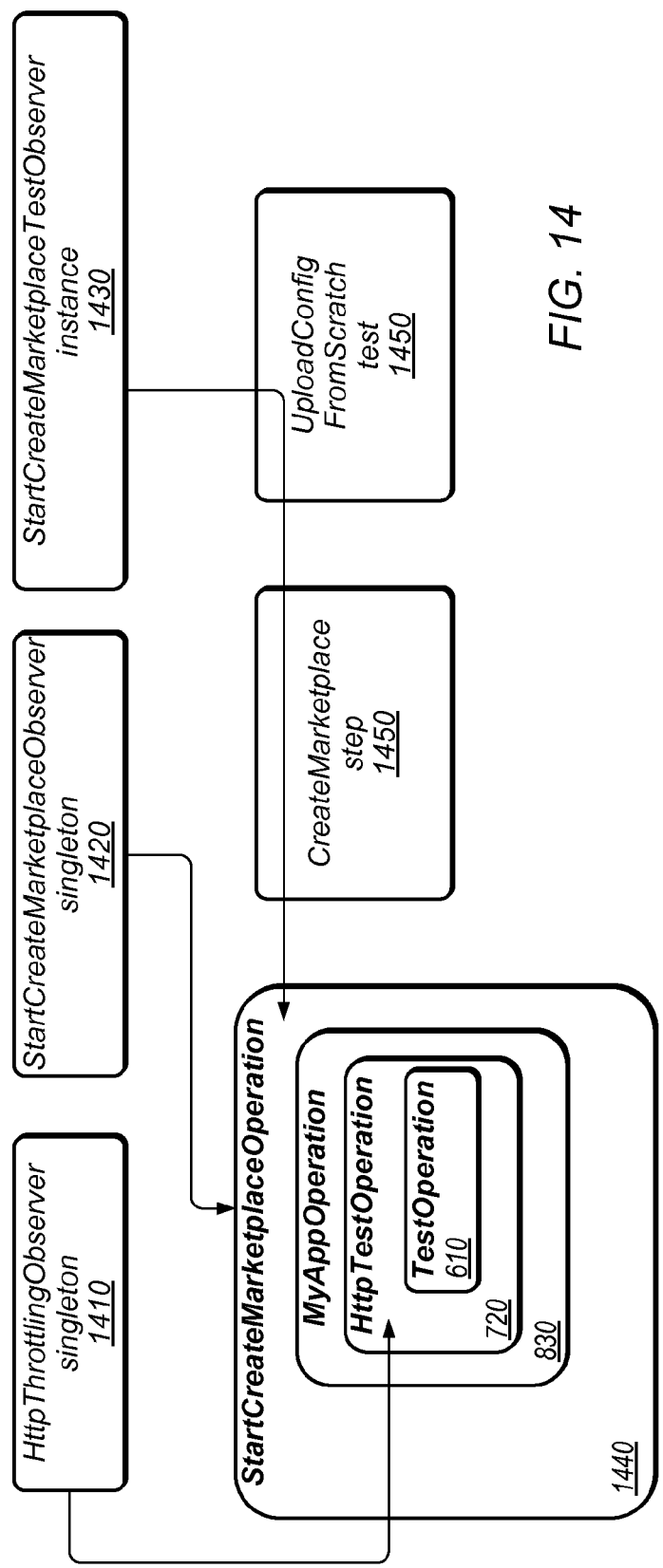
FIG. 14 is a block diagram illustrating various examples of the use of observers in a hierarchical test framework, according to one embodiment.

FIG. 14 illustrates various uses of observers in the example test framework described above. In this example, an HttpThrottlingObserver singleton 1410 is plugged into the HttpTestOperation layer 720, e.g., to track the percentages of throttled requests, as described above. A StartCreateMarketplaceObserver singleton 1420 is plugged into the StartCreateMarketplaceOperation layer 1440. This may be used to observe and/or collect information normally accessible only at this layer in the test framework hierarchy. An addition, an instance of a StartCreateMarketplaceTestObserver 1430 (which may be applied to each object of the StartCreateMarketplaceOperation object class) is plugged into StartCreateMarketplaceOperation layer 1440 through CreateMarketplace step 1450 and UploadConfigFromScratch test 1450. This may provide access to low-level information that was observed by the StartCreateMarketplaceTestObserver instance 1430 to both the test and step.

In some embodiments, the test framework architectures describe herein, or test configuration systems thereof, may be designed to allow test data to be stored independently from the test code and/or the test framework code so that a given test can be executed using multiple data sets. In some embodiments, the test configuration system may follow the layering concepts described herein. For example, in one embodiment, test data may be stored in XML format and may include any number of parent XML files. In some embodiments, the behaviors or values of parent XML files may be overridden.

In one example, a valid data file may conform to the schema defined by the following pseudo-code:

```
<xsd:schema xmlns:xsd="http://www.w3.org/2001/XMLSchema">
    <xsd:element name="configuration" type="configurationType"/>
    <xsd:complexType name="configurationType">
      <xsd:choice minOccurs="0" maxOccurs="unbounded">
        <xsd:element name="param" type="paramType"/>
        <xsd:element name="include" type="includeType"/>
      </xsd:choice>
    </xsd:complexType>
    <xsd:complexType name="includeType">
      <xsd:sequence/>
      <xsd:attribute name="location" type="xsd:string"/>
    </xsd:complexType>
    <xsd:complexType name="paramType">
      <xsd:sequence/>
      <xsd:attribute name="name" type="xsd:string"/>
      <xsd:attribute name="value" type="xsd:string"/>
    </xsd:complexType>
</xsd:schema>
```

As illustrated in this example, in some embodiments, a "param" element may be used to define a test parameter. In this example, the "name" attribute may contain its name and the "value" parameter may contain its value. In some embodiments, such as the one illustrated above, an "include" element may contain a reference to another data file. In such embodiments, a "location" attribute may contain the location of that file relative to the location of the current file (i.e. the file that references it). This may provide a mechanism for the reuse of existing data files. In some embodiments, parameters that are common to many tests (such as a service's endpoint URL or port) may be stored in a separate file that may then be included in the data for any test through the use of such an "include" element.

In some embodiments, tests may use a configuration class that may also be layered according to the test framework hierarchy (e.g., into TestConfiguration, HttpTestConfiguration, and MyAppHttpTestConfiguration classes) to access the data stored in the files. Objects of this class may know how to find the target data files. In some embodiments, these objects may open the data files and read the children elements of a root "configuration" element in each file (e.g., using a config( ) method) in the order in which they appear. In some embodiments, every time the object finds a "param" element, it may store the parameter's value in a hash table using the parameter's name as the key. In some embodiments, if there is a name collision, a value read later may override any previous value for a given parameter name (key). Each time the object finds an "include" element, it may recursively process the included file at the location indicated by its "location" attribute. In some embodiments, such a configuration class may be accessible to all the classes in the test framework hierarchy. Objects of the configuration class may expose a getParam( ) method for the framework to use to fetch the specific data needed to run a given test from the hash table built by its config( ) method. This data may include operation data (such as a target web endpoint), overall test parameters (such as the number of iterations to run a particular test), test input data (e.g., a set of values for input parameters of a given operation) or any other parameterized data required to run a given test.

Figure 15:
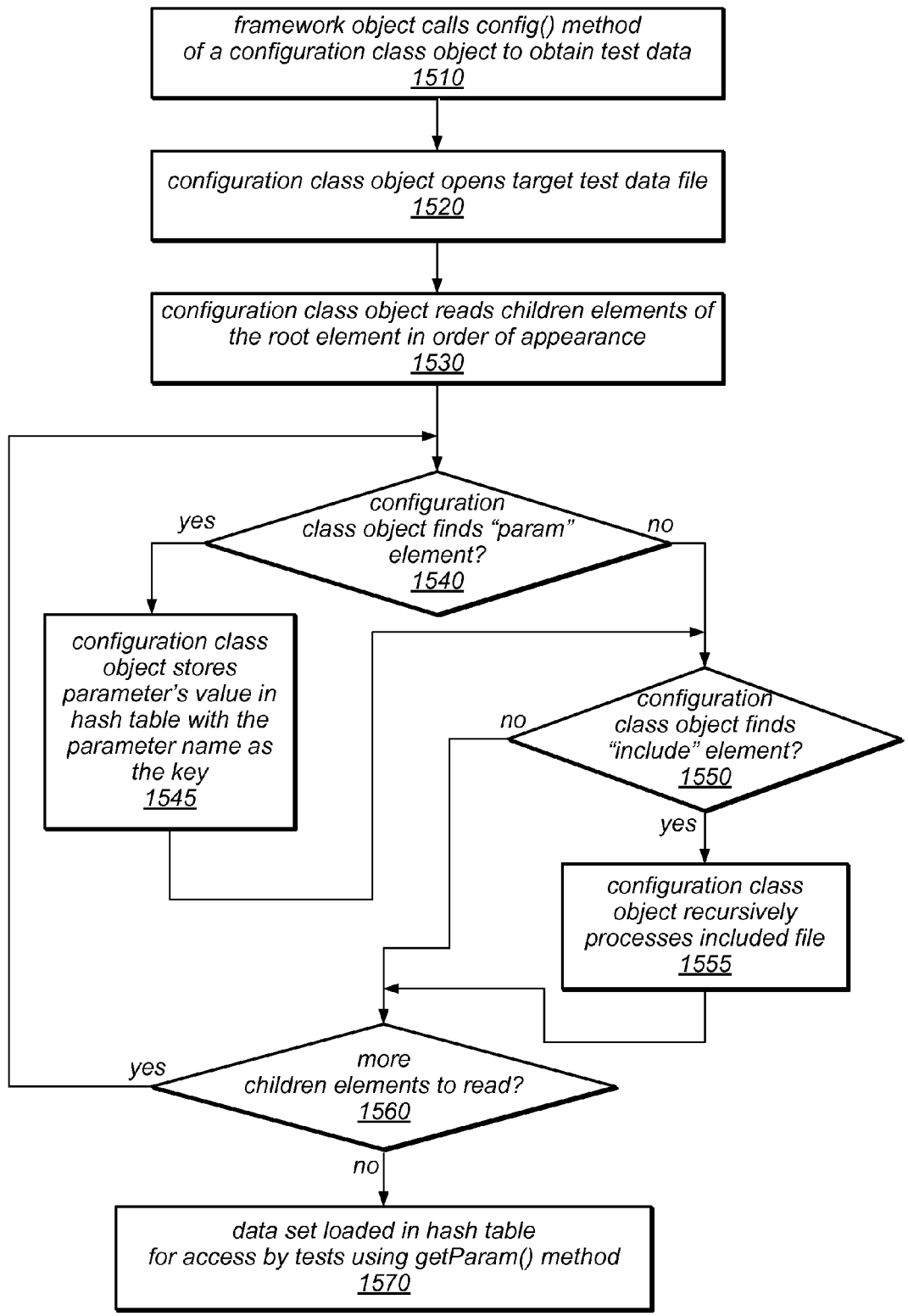
FIG. 15 is a flow diagram illustrating one embodiment of a method for accessing test data using a configuration class.

FIG. 15 illustrates one embodiment of a method for accessing test data (e.g., data stored in one or more test data sets) using such a configuration class. As illustrated at 1510, in this example, the method may include a framework object (e.g., one invoked on behalf of a given test, or a test operation thereof) calling a config( ) method of a configuration class object to obtain test data. As noted above the configuration class object may be an object of a generic configuration class, or a derived configuration class (e.g., at layer of the test framework hierarchy other than the layer at which a package of generic configuration class objects is defined). The configuration class object may open the target test data file, as in 1520, and read children elements of the root element in order of appearance, as in 1530. If the configuration class object encounters a "param" element, shown as the positive exit from 1540, the method may include the configuration class object storing the parameter's value in a hash table with the parameter name as the key, as in 1545. As noted above, if the hash table already includes an entry with the same key, a value that was read later may override a previously stored value.

As illustrated in this example, if the configuration class object encounters an "include" element specifying a file name, shown as the positive exit from 1550, the configuration class object may recursively process the included file, as in 1555. For example, the method may include the configuration class object reading all the children elements of the root element in the included file, may store parameter values found in the included file in the hash table, and may recursively process any files included within the included file itself. As long as there are more children elements to read, shown as the positive exit from 1560, the method may include repeating the operations illustrated at 1540-1560 until all of the children elements have been read from this file. This is shown in FIG. 15 as the feedback from 1560 to 1540. Once all children elements have been read and any included files have been recursively processed, the data set has been loaded into a hash table and is ready for access by the test, as in 1570. For example, the test may access the data in the hash table by calling the getParam( ) method of the configuration class object that loaded the hash table and specifying a key that corresponds to a particular test parameter. The getParam( ) method may use the key to look up the value of the test parameter in the hash table and return it to the test. Note that in some embodiments, the same test may be subsequently run with different test data, since the test data is not included in the test code but is stored external to the test itself. For example, the test may include a call to a configuration class object specifying a different data file. The configuration class object may repeat the operations illustrated in FIG. 15 to load a hash table with the data found in this other file (and in any files indicated as included files in the other file). The test may call the getParam( ) method to fetch these new values of the test parameters from the corresponding hash table.

The methods described herein for implementing a test framework and developing tests using the techniques described herein may be implemented on a wide variety of computing systems using any number of underlying system configurations and/or data storage architectures, in different embodiments. For example, in some embodiments, the test framework described herein may be implemented on one or more computing nodes coupled to each other, to computing nodes hosting a web service to be exercised by one or more tests (e.g., a pre-release version of the web service) and/or to various client computing nodes through wired and/or wireless interfaces according to one or more standard communication protocols. The components making up such a system (e.g., client libraries, tests, test frameworks or sub-framework packages thereof, data sets or storage for data sets, hash tables, counters, or other data structures used by the tests or test framework, administrative servers, gateway processes, database servers, subscriber applications, shared computing resources, or other components configured to implement the functionality of these components as described herein), may be resident on a single computing node or may be distributed across multiple nodes, whether in a single location or at multiple sites, in different embodiments.

Figure 16:
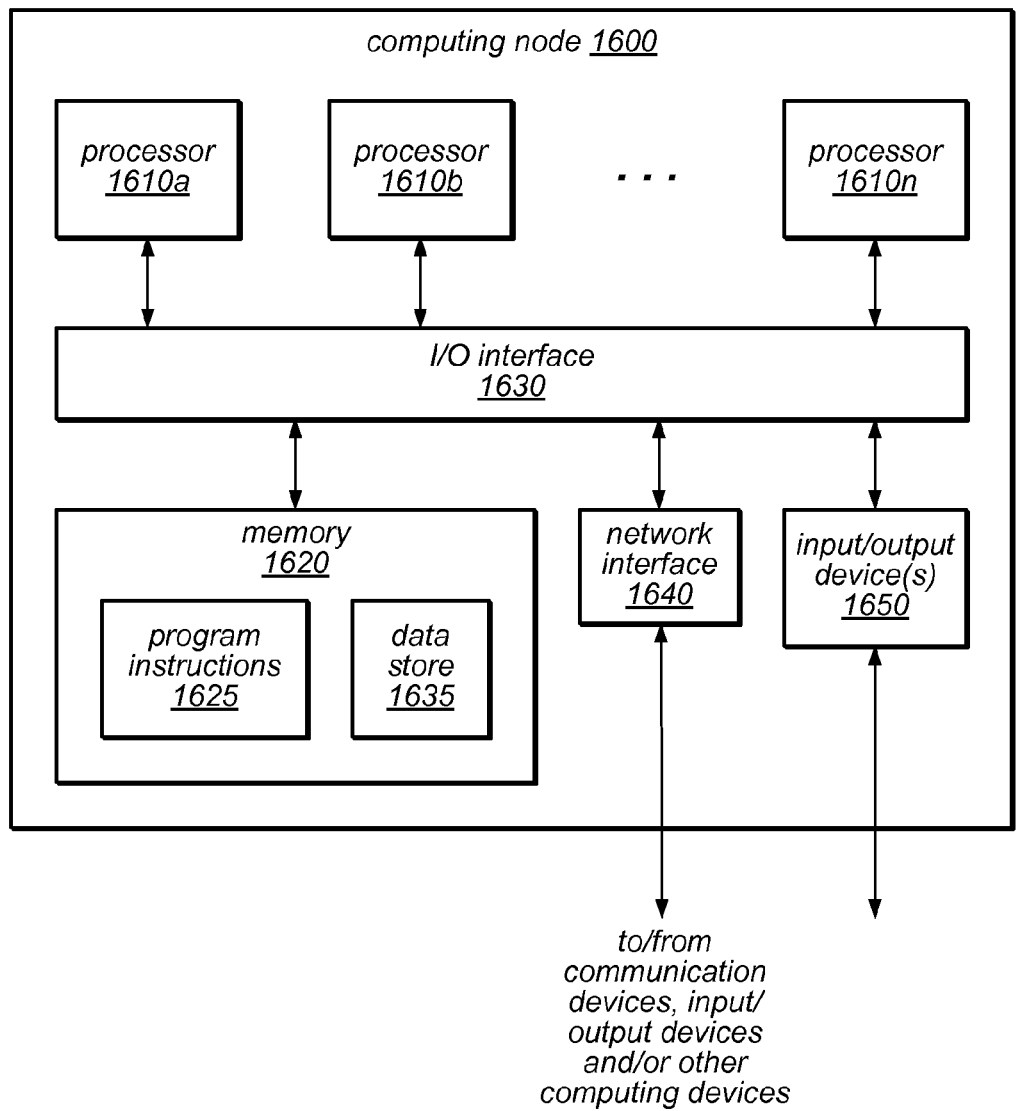
FIG. 16 is a block diagram illustrating one embodiment of a computing node suitable for implementation of the test framework and test development techniques described herein.

One computing node that may be suitable for implementation of the test framework and test development techniques described herein is illustrated in FIG. 16. As noted above, computing node 1600 may include functionality to provide any or all of the components of various computing systems described herein, or multiple computing nodes similar to or different from computing node 1600 may collectively provide this functionality, in different embodiments. For example, in one embodiment, one or more computing nodes 1600 that implement client application servers (e.g., to provide access to a web service under test) may also be configured to provide libraries of various operation objects, functions, or utilities (e.g., for use by test developers and/or test framework developers), while in other embodiments, one or more computing nodes 1600 configured to provide client application servers (e.g., to provide access to a web service under test) may also provide the test framework itself. In still other embodiments, the test framework, web service under test, and client tests may be executed on different ones of a plurality of computing nodes 1600. In some embodiments that include multiple computing nodes 1600, all of the computing nodes 1600 may include the same or similar hardware components, software components, and functionality, while in other embodiments, the computing nodes 1600 comprising a computing system configured to implement the functionality described herein may include a wide variety of hardware components, software components, and functionality.

In the illustrated embodiment, computing node 1600 includes one or more processors 1610 coupled to a system memory 1620 via an input/output (I/O) interface 1630. Computing node 1600 further includes a network interface 1640 coupled to I/O interface 1630, and one or more input/output devices 1650. As noted above, in some embodiments, a given node may implement the functionality of more than one component of a computing system providing a test framework, web service under test, and/or test client, as described herein. In various embodiments a computing node 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA. Similarly, in a distributed computing system such as that described herein, each of the computing nodes may implement the same ISA, or individual nodes and/or replica groups of nodes may implement different ISAs.

System memory 1620 may be configured to store program instructions and/or data accessible by processor 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1620 as program instructions 1625 and data storage 1635, respectively. For example, program instruction 1625 may include any or all of client libraries, tests, test frameworks or sub-framework packages thereof, administrative servers, gateway processes, database servers, subscriber applications, shared computing resources, or other components configured to implement the functionality of these components as described herein. Program instructions 1625 may also include program instructions configured to implement additional functionality of a computing system not described herein.

Data storage 1635 may in various embodiments include one or more test data sets, hash tables, counters, or other data in other data structures used by the components of the test framework, tests, and/or web service under test. In other embodiments, program instructions and/or data as described herein for implementing a test framework, a web service under test, and/or various tests may be received, sent or stored upon different types of computer-readable media or on similar media separate from system memory 1620 or computing node 1600, including various types of non-transitory computer-readable media. Generally speaking, a non-transitory computer-readable storage medium may include storage media or memory media such as magnetic or optical media, e.g., disk or CD/DVD-ROM coupled to computing node 1600 via I/O interface 1630. Program instructions and data stored on a computer-readable storage medium may be transmitted to a computing node 1600 for execution by a processor 1610a by transmission media or signals such as electrical, electromagnetic, or digital signals, which may be conveyed via a communication medium such as a network and/or a wireless link, such as may be implemented via network interface 1640.

In one embodiment, I/O interface 1630 may be configured to coordinate I/O traffic between processor 1610, system memory 1620, and any peripheral devices in the computing node, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computing node 1600 and other devices attached to a network, such as other computer systems, or between other nodes in a system providing shared computing services. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or retrieving data by one or more computing nodes 1600. Multiple input/output devices 1650 may be present in computing node 1600 or may be distributed on various nodes of a shared resource system or grid computing system. In some embodiments, similar input/output devices may be separate from computing node 1600 and may interact with one or more nodes of a shared resource system through a wired or wireless connection, such as over network interface 1640.

Users may interact with a computing system providing a test framework, web service under test, and/or test client in various ways in different embodiments, such as to develop and/or store tests, to develop and/or store sub-framework packages, to store one or more data sets, to exercise a web service under test using various tests and/or sub-framework packages, and/or to receive results of test exercises. For example, some users (e.g., web service developers, test developers, and/or test framework developers) may have physical access to computing node 1600, and if so, may interact with various input/output devices 1650 to provide and/or receive information. Alternatively, other users may use client computing systems to access the system, such as remotely via network interface 1640 (e.g., via the Internet and/or the World Wide Web). In addition, some or all of the computing nodes of a system providing the service may provide various feedback or other general types of information to users via one or more input/output devices 1650.

Those skilled in the art will appreciate that computing node 1600 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1600 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a non-transitory computer-readable storage medium or a portable article to be read by an appropriate drive, various examples of which are described above. In some embodiments, instructions stored on a computer-readable storage medium separate from computing node 1600 may be transmitted to computing node 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form.

For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computing system, comprising:
   one or more processors; and
   a memory storing program instructions executable by the one or more processors to implement a test framework and one or more tests;
   wherein the test framework comprises:
   a sub-framework package comprising a plurality of objects of a test operation object class; and
   another sub-framework package comprising a plurality of objects of a second operation object class that wrap objects of the test operation object class;
   wherein individual ones of the one or more tests comprise one or more test steps that comprise one or more test operations implemented using at least one object of the plurality of objects of the test operation object class or the plurality of objects of the second operation object class;
   wherein a first one of the one or more tests comprises a given test step and is executable to test a feature of a first web services application;
   wherein a second one of the one or more tests comprises the given test step and is executable to test a feature of a second web services application; and
   wherein at least one object used in implementing the given test step during execution of the second test is different from objects used in implementing the given test step during execution of the first test.

2. The computing system of claim 1,
   wherein, when instantiated, one or more of the objects of the test operation object class is configured to: receive a request specifying a method of the object and comprising one or more request parameter values, invoke the specified method, and return a response comprising one or more response parameter values.

3. The computing system of claim 1,
   wherein a third one of the one or more tests is executable to test a second feature of the first web services application;
   wherein objects used in implementing test operations during execution of the third test are objects of a different sub-framework package than objects used in implementing test operations during execution of the first test.

4. The computing system of claim 1,
   wherein a third one of the one or more tests is executable to test a second feature of the first web services application;
   wherein objects used in implementing test operations during execution of the third test are objects of a same sub-framework package as objects used in implementing test operations during execution of the first test.

5. The computing system of claim 1,
   wherein a third one of the one or more tests comprises the given test step and is executable to test a second feature of the first web services application; and
   wherein at least one object used in implementing the given test step during execution of the third test is different from objects used in implementing the given test step during execution of the first test.

6. A method, comprising:
   using a computer to perform:
   storing a plurality of objects of a test operation object class in memory as a sub-framework package of a test framework, wherein methods of objects in the test operation object class are usable in exercising an application programming interface of one or more products;
   deriving a second operation object class from the test operation object class, wherein objects of the second operation object class wrap objects of the test operation object class;
   storing a plurality of objects of the second operation object class in memory as a second sub-framework package of the test framework;
   developing one or more tests for testing features of a given product;
   wherein the one or more tests comprise one or more test operations implemented using at least one object of the plurality of objects of the test operation object class or the plurality of objects of the second operation object class.

7. The method of claim 6, wherein objects of the second operation object class comprise methods usable in exercising features specific to products in a particular application domain, features specific to products of a particular application type, or features of a specific application.

8. The method of claim 6,
wherein at least one of the one or more tests comprises one or more test steps in one of one or more intermediate levels of abstraction; and
wherein at least one test step at one of the one or more intermediate levels of abstraction comprises one or more of the test operations.

9. The method of claim 6, wherein, when instantiated, at least one object of the test operation object class is configured to: receive a request specifying a method of the object and comprising one or more request parameter values, invoke the specified method, and return a response comprising one or more response parameter values.

10. The method of claim 6, further comprising:
deriving a third operation object class from the second operation object class, wherein objects of the third operation object class wrap objects of the second operation object class; and
storing a plurality of objects of the third operation object class in memory as a third sub-framework package of the test framework.

11. The method of claim 6, further comprising:
deriving a third operation object class from the test operation object class, wherein objects of the third operation object class wrap objects of the test operation object class;
storing a plurality of objects of the third operation object class in memory as a third sub-framework package of the test framework.

12. The method of claim 6, wherein the sub-framework package and the second sub-framework package are distinct executable entities.

13. The method of claim 6, further comprising:
in response to a change in the given product, modifying at least one of the one or more tests;
wherein said modifying comprising modifying only one or more test operations of the at least one test.

14. A method, comprising:
using a computer to perform:
developing a plurality of test operations, wherein individual ones of the test operations respectively wrap an application programming interface of one or more applications to be tested, wherein the individual ones of the plurality of test operations are implemented using respective objects of one of a plurality of sub-framework packages of operation objects in a test framework hierarchy, and wherein objects of one sub-framework package are objects of an operation object class that wrap objects of a test operation object class of another sub-framework package;
developing one or more respective verification checks for individual ones of the test operations;
developing a first test for a given application comprising two or more of the plurality of test operations, wherein the two or more test operations are called by one or more test steps at one or more intermediate levels of abstraction in a test hierarchy, and wherein the first test inherits the verification checks for the test operations implementing the one or more test steps; and
storing the first test in memory for execution during testing of the given application.

15. The method of claim 14, further comprising:
executing the first test, wherein the first test is successful only if all of the verification checks of the two or more test operations succeed.

16. The method of claim 14, further comprising:
developing the one or more test steps at a first intermediate level of abstraction in the test hierarchy;
wherein at least one test step is usable in testing a function of the given application that is performed using one or more application programming interface elements;
wherein at least one test step comprises one or more of the two or more test operations; and
wherein at least one of the one or more test steps at the first intermediate level of abstraction inherits the verification checks for its test operations.

17. The method of claim 16, further comprising:
developing one or more verification checks for at least one of the one or more test steps; and
storing the one or more verification checks for the at least one test step in the memory as part of the first test;
wherein the one or more verification checks for the at least one test step are usable to verify functionality of the test step that is not verified by the verification checks for the test operations; and
wherein the first test is successful only if all of the verification checks for the one or more test steps succeed.

18. The method of claim 14, further comprising:
developing a second test for the given application; and
storing the second test in memory for execution during testing of the given application;
wherein the second test is executable to test at least one feature of the given application not tested by the first test;
wherein the second test comprises at least one of the two or more test operations included in the first test.

19. The method of claim 14, further comprising:
developing a second test, wherein the second test is executable to test a second application; and
storing the second test in memory for execution during testing of the second application;
wherein the second test comprises at least one of the two or more test operations included in the first test.

20. The method of claim 14, further comprising:
developing a second test, wherein the second test is executable to test a second application or a feature of the given application not tested by the first test; and
storing the second test in memory for subsequent execution;
wherein the second test comprises at least one test operation implemented using an object of a sub-framework package of operation objects other than a sub-framework package comprising operation objects implementing the two or more test operations included in the first test.

21. The method of claim 14, further comprising:
developing a second test, wherein the second test is executable to test a second application or a feature of the given application not tested by the first test; and
storing the second test in memory for subsequent execution;
wherein the second test comprises at least one test step included in the first test; and
wherein at least one test operation used in implementing the at least one test step in the second test is a different from test operations used implementing the at least one test step in the first test.

22. The method of claim 14, further comprising:
executing the first test;
wherein said executing comprises accessing input data for the first test from one of a plurality of data sets for the first test that are stored separately from the first test in the memory;
wherein said accessing is provided through one or more objects of a configuration class included in the first test; and
wherein objects of the configuration class comprise methods for extracting test parameter values from a data set.

23. The method of claim 14, further comprising:
executing the first test;
wherein said executing comprises a test step at one of the intermediate levels of abstraction in the test hierarchy accessing data observed by a test step at a different one of the intermediate levels of abstraction or by one of the first test operations;
wherein said accessing data comprises accessing data tracked by an observer pattern of an operation object in the test framework hierarchy.

24. A computing system, comprising:
one or more processors; and
a memory storing program instructions executable by the one or more processors to implement a test framework;
wherein the test framework comprises:
a sub-framework package comprising a plurality of objects of a test operation object class; and
at least one other sub-framework package comprising a plurality of objects of a different operation object class that wrap objects of the test operation object class; and
wherein during execution, the test framework is configured to:
receive a request to execute a specified method of an object of an identified operation object class in one of the at least one other sub-framework packages, wherein objects of the identified operation object class wrap objects of a test operation object class;
execute the specified method; and
return a response;
wherein in executing the specified method in response to the request, the test framework is configured to invoke a method of an object of the test operation object class.

25. The system of claim 24,
wherein during execution, the test framework is configured to:
receive a second request to execute the specified method;
execute the specified method in response to the second request; and
return a second response;
wherein in executing the specified method in response to the second request, the test framework is configured to invoke a method of a second object of the test operation object class.

26. The system of claim 24, wherein the request comprises one or more request parameter values.

27. The system of claim 26, wherein the one or more request parameter values are values of input parameters of the specified method of the object of the identified object class.

28. The system of claim 26, wherein the one or more request parameter values are values of input parameters of a method of an object of the test operation object class.

29. The system of claim 24, wherein response comprises one or more response parameter values.

30. The system of claim 29, wherein the one or more response parameter values are values of response parameters of the specified method of the object of the identified object class.

31. The system of claim 29, wherein the one or more response parameter values are values of response parameters of a method of an object of the test operation object class.

32. A non-transitory computer-readable storage medium, storing program instructions computer-executable to implement:
storing a plurality of objects of a test operation object class in memory as a sub-framework package of a test framework hierarchy, wherein methods of objects in the test operation object class are usable in exercising an application programming interface of one or more applications;
deriving a second operation object class from the test operation object class, wherein objects of the second operation object class wrap objects of the test operation object class;
storing a plurality of objects of the second operation object class in memory as a second sub-framework package of the test framework hierarchy; and
developing a test for testing features of a given application;
wherein the test comprises one or more test operations implemented using at least one object of the plurality of objects of the test operation object class or the plurality of objects of the second operation object class.

33. The non-transitory computer-readable storage medium of claim 32,
wherein the program instructions are further computer-executable to implement developing a second test;
wherein the second test is executable to test a feature of the given application not tested by the test or a feature of a second application;
wherein the second test comprises one or more test steps at an intermediate level of abstraction in a test hierarchy;
wherein at least one of the one or more test steps of the second test comprises one or more test operations; and
wherein the second test comprises at least one of the test operations of the test.

34. The non-transitory computer-readable storage medium of claim 32,
wherein the program instructions are further computer-executable to implement developing a second test;
wherein the second test is executable to test a feature of the given application not tested by the test or a feature of a second application;
wherein the second test comprises one or more test steps at an intermediate level of abstraction in a test hierarchy;
wherein at least one of the one or more test steps of the second test comprises one or more test operations; and
wherein the second test comprises at least one test operation executable to request a method of an object of a sub-framework package of the test framework hierarchy other than the sub-framework package and the second sub-framework package of the test framework hierarchy.

35. The non-transitory computer-readable storage medium of claim 32,
wherein the program instructions are further computer-executable to implement developing a second test;
wherein the second test is executable to test a feature of the given application not tested by the test or a feature of a second application;
wherein the second test comprises one or more test steps at one of one or more intermediate levels of abstraction in the test hierarchy;

wherein at least one of the one or more test steps of the second test comprises one or more test operations;

wherein the second test comprises at least one test step included in the test; and wherein at least one test operation of the at least one test step in the second test is different from test operations included in the at least one test step in the test.

36. The non-transitory computer-readable storage medium of claim 32, wherein the program instructions are further computer-executable to implement accessing input data for the test from one of a plurality of data sets for the test that are stored in memory;

wherein said accessing is provided through one or more objects of a configuration class included in the test; and wherein objects of the configuration class comprise methods for extracting test parameter values from a data set.

37. The non-transitory computer-readable storage medium of claim 32, wherein the program instructions are further computer-executable to implement a test step at one of one or more intermediate levels of abstraction in the test hierarchy accessing data observed by a test step at a different one of the one or more intermediate levels of abstraction or by one of the test operations;

wherein said accessing data comprises accessing data tracked by an observer pattern of an operation object in the test framework hierarchy.

* * * * *